(12) United States Patent
Kuno et al.

(10) Patent No.: US 7,385,726 B2
(45) Date of Patent: Jun. 10, 2008

(54) METHOD FOR PREPARING PROFILES

(75) Inventors: Masashi Kuno, Obu (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 234 days.

(21) Appl. No.: 11/159,093

(22) Filed: Jun. 23, 2005

(65) Prior Publication Data

US 2005/0237551 A1 Oct. 27, 2005

Related U.S. Application Data

(62) Division of application No. 09/764,152, filed on Jan. 19, 2001, now Pat. No. 6,975,426.

(30) Foreign Application Priority Data

Jan. 21, 2000 (JP) .............................. 2000-17798

(51) Int. Cl.
*G06K 15/00* (2006.01)
*G06F 3/048* (2006.01)

(52) U.S. Cl. ...................... 358/1.18; 358/1.9; 358/2.1; 715/788; 715/789

(58) Field of Classification Search ............... 358/1.15, 358/1.13, 1.16, 522, 524, 443, 444, 1.12, 358/1.18, 1.14, 1.9, 2.1; 715/788, 789
See application file for complete search history.

(56) References Cited

U.S. PATENT DOCUMENTS

| 4,959,711 | A | | 9/1990 | Hung et al. |
| 5,172,223 | A | | 12/1992 | Suzuki et al. |
| 5,416,614 | A | | 5/1995 | Crawford |
| 5,500,890 | A | | 3/1996 | Rogge et al. |
| 6,134,017 | A | * | 10/2000 | Schlank et al. ............ 358/1.15 |
| 6,433,884 | B1 | * | 8/2002 | Kawakami .................. 358/1.15 |
| 2001/0012396 | A1 | * | 8/2001 | Kumada ..................... 382/162 |
| 2003/0142332 | A1 | * | 7/2003 | Endoh et al. .............. 358/1.11 |
| 2003/0225835 | A1 | | 12/2003 | Klien et al. |
| 2004/0049515 | A1 | | 3/2004 | Haff et al. |
| 2004/0172248 | A1 | | 9/2004 | Otsuka et al. |
| 2004/0172468 | A1 | | 9/2004 | Cai et al. |

OTHER PUBLICATIONS

U.S. Appl. No. 09/757,649, filed Jan. 11, 2001, Masashi Kuno et al.

* cited by examiner

*Primary Examiner*—Jerome Grant, II
(74) *Attorney, Agent, or Firm*—Oliff & Berridge, PLC

(57) ABSTRACT

A method for updating profiles is provided. The method involves storing a plurality of successive profiles for an image recording device, and changing at least two of the successive profiles when characteristics of the image recording device change. The profiles are successively used to process image data that is used for recording images on a recording medium by the image recording device.

44 Claims, 9 Drawing Sheets

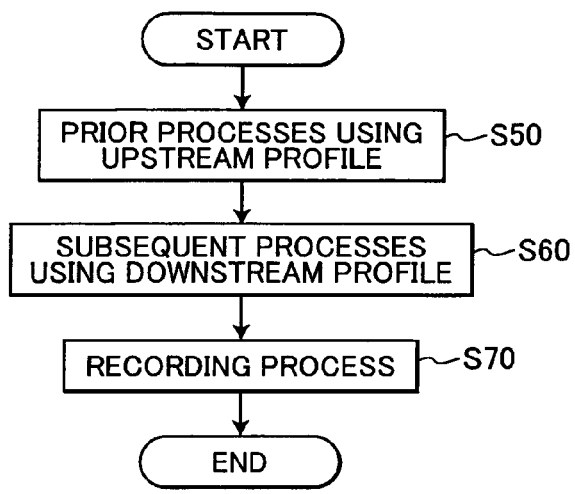
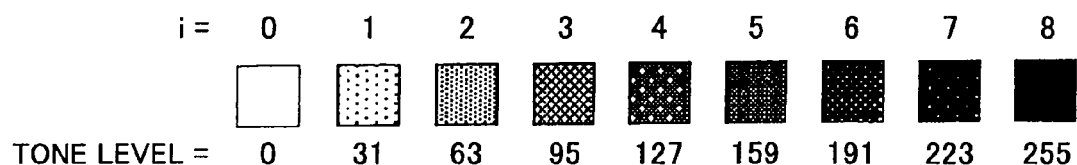

FIG.6

| COLOR DATA | | | | COLOR-CORRECTED COLOR DATA | | | |
|---|---|---|---|---|---|---|---|
| C | M | Y | K | C' | M' | Y' | K' |
| 0 | 0 | 0 | 0 | 0 | 0 | 0 | 0 |
| 0 | 0 | 0 | 31 | 2 | 4 | 0 | 30 |
| ⋮ | ⋮ | ⋮ | ⋮ | ⋮ | ⋮ | ⋮ | ⋮ |
| 0 | 0 | 0 | 223 | 1 | 2 | 5 | 220 |
| 0 | 0 | 0 | 255 | 3 | 1 | 10 | 254 |
| 0 | 0 | 31 | 0 | 6 | 0 | 35 | 2 |
| 0 | 0 | 31 | 31 | 0 | 1 | 31 | 28 |
| ⋮ | ⋮ | ⋮ | ⋮ | ⋮ | ⋮ | ⋮ | ⋮ |
| 0 | 0 | 31 | 223 | 1 | 5 | 29 | 218 |
| 0 | 0 | 31 | 255 | 0 | 0 | 29 | 255 |
| 0 | 0 | 63 | 0 | 5 | 7 | 70 | 10 |
| 0 | 0 | 63 | 31 | 10 | 10 | 60 | 28 |
| ⋮ | ⋮ | ⋮ | ⋮ | ⋮ | ⋮ | ⋮ | ⋮ |
| 0 | 0 | 63 | 223 | 2 | 7 | 59 | 230 |
| 0 | 0 | 63 | 255 | 1 | 4 | 66 | 247 |
| ⋮ | ⋮ | ⋮ | ⋮ | ⋮ | ⋮ | ⋮ | ⋮ |

[LIGHT INK CONVERSION TABLE]

| COLOR DATA | LIGHT INK DATA | COLOR DATA | LIGHT INK DATA | COLOR DATA | LIGHT INK DATA |
|---|---|---|---|---|---|
| 0 | 0 | ⋮ | ⋮ | ⋮ | ⋮ |
| 1 | 2 | | | | |
| 2 | 4 | 126 | 254 | 248 | 14 |
| 3 | 6 | 127 | 255 | 249 | 12 |
| 4 | 8 | 128 | 254 | 250 | 10 |
| 5 | 10 | 129 | 252 | 251 | 8 |
| 6 | 12 | 130 | 250 | 252 | 6 |
| 7 | 14 | 131 | 248 | 253 | 4 |
| ⋮ | ⋮ | ⋮ | ⋮ | 254 | 2 |
| | | | | 255 | 0 |

[NORMAL INK CONVERSION TABLE]

| COLOR DATA | NORMAL INK DATA | COLOR DATA | NORMAL INK DATA | COLOR DATA | NORMAL INK DATA |
|---|---|---|---|---|---|
| 0 | 0 | ⋮ | ⋮ | ⋮ | ⋮ |
| 1 | 0 | | | | |
| 2 | 0 | 126 | 0 | 248 | 241 |
| 3 | 0 | 127 | 1 | 249 | 243 |
| 4 | 0 | 128 | 3 | 250 | 245 |
| 5 | 0 | 129 | 5 | 251 | 247 |
| 6 | 0 | 130 | 7 | 252 | 249 |
| 7 | 0 | 131 | 9 | 253 | 251 |
| ⋮ | ⋮ | ⋮ | ⋮ | 254 | 253 |
| | | | | 255 | 255 |

T3an (T3cn, T3mn)

METHOD FOR PREPARING PROFILES

This is a Division of application Ser. No. 09/764,152 filed Feb. 19, 2001. The entire disclosure of the prior application is hereby incorporated by reference herein in its entirety.

BACKGROUND OF THE INVENTION

1. Field of the Invention

The present invention relates to a method of preparing upstream profiles and downstream profiles which are used for processing image data before the image data is used in a recording process in a manner that the upstream profiles are used for performing prior processes onto image data and the downstream profiles are used for performing subsequent processes onto the image data which has already been subjected to the prior processes.

2. Description of Related Art

There has been known an image forming device, such as a color printer, that records color images on a recording medium using four colors of ink, for example, cyan (C), magenta (M), yellow (Y), and black (K) ink. It is noted that the density level, actually outputted onto the recording medium, can vary according to a variety of conditions, such as the model of the printer, the resolution, the type of ink, and the type of recording medium. Therefore, according to the variation in those conditions, it will become impossible to faithfully reproduce color images, which are retrieved using a scanner, or prepared in a computer, if they are recorded onto a recording medium according to image data inputted as is from the computer or the scanner.

For this reason, before recording an image on a recording medium based on image data inputted from a computer or the like, normally the input image data is first corrected based on profiles in order to reproduce original images as faithfully as possible.

SUMMARY OF THE INVENTION

Examples of profiles include upstream and downstream profiles. The upstream profile is used for performing prior processes on the input image data. The downstream profile is used for performing subsequent processes on the input image data, which has already been subjected to the prior processes using the upstream profile. The image data thus subjected to the downstream profile is then used for recording a corresponding image onto a recording medium.

More specifically, the upstream profile is for correcting tone of input image data in order to correct for changes due to passage of time, for unique characteristics of the image recording device itself, and for other factors. The downstream profile is for further calibrating the input image data, already subjected to the tone correction based on the upstream profile, in order to more precisely correct for the changes due to passage of time, for the unique characteristics of the image recording device itself, and for other factors.

Because the upstream profile and the downstream profile are interrelated in this way, the upstream profile, which will be used during the prior process, should be prepared after the downstream profile, which will be used during the subsequent process, is prepared.

It is an objective of the present invention to provide a method of efficiently preparing the interrelated upstream and downstream profiles.

In order to attain the above and other objects, the present invention provides a method for preparing an upstream profile and a downstream profile, both of which are for being used to process image data for recording images on a recording medium, the upstream profile being used for performing a prior process onto the image data and the downstream profile being used for performing a subsequent process on the image data already processed by the prior process, the method comprising the steps of: preparing a downstream profile; preparing an upstream profile using the prepared downstream profile; and judging, after the downstream profile preparation process and before the upstream profile preparation process, whether the downstream profile has been properly prepared, and when it is judged that the downstream profile has been improperly prepared, preventing the upstream profile preparation process from being performed based on the improperly-prepared downstream profile.

According to another aspect, the present invention provides an apparatus for preparing an upstream profile and a downstream profile, both of which are for being used to process image data for recording images on a recording medium, the upstream profile being used for performing a prior process onto the image data and the downstream profile being used for performing a subsequent process on the image data already processed by the prior process, the apparatus comprising: a downstream preparing unit preparing a downstream profile; an upstream preparing unit preparing an upstream profile using the prepared downstream profile; and a judging unit judging, after the downstream profile preparation process and before the upstream profile preparation process, whether the downstream profile has been properly prepared, and when it is judged that the downstream profile has been improperly prepared, preventing the upstream profile preparation unit from performing the preparation based on the improperly-prepared downstream profile.

According to still another aspect, the present invention provides a data storage medium storing, in a manner readable by a computer, a program of preparing an upstream profile and a downstream profile, both of which are for being used to process image data for recording images on a recording medium, the upstream profile being used for performing a prior process onto the image data and the downstream profile being used for performing a subsequent process on the image data already processed by the prior process, the program comprising: a program of preparing a downstream profile; a program of preparing an upstream profile using the prepared downstream profile; and a program of judging, after the downstream profile preparation process and before the upstream profile preparation process, whether the downstream profile has been properly prepared, and when it is judged that the downstream profile has been improperly prepared, preventing the upstream profile preparation process from being performed based on the improperly-prepared downstream profile.

BRIEF DESCRIPTION OF THE DRAWINGS

The above and other objects, features and advantages of the invention will become more apparent from reading the following description of the embodiment taken in connection with the accompanying drawings in which:

FIG. 2(a) is a flowchart representing an image recording process performed by using an upstream profile and a downstream profile;

FIG. 2(b) is a schematic view showing color patches printed on a recording medium by the profile preparation system of FIG. 1;

FIG. 6 is a schematic view showing a color correction table used during the image recording processes;

FIG. 9(a) is a schematic view showing a light ink conversion table representing the relationship, between the color data and light ink data, shown in FIG. 8;

FIG. 9(b) is a schematic view showing a normal ink conversion table representing the relationship, between the color data and normal ink data, shown in FIG. 8.

DETAILED DESCRIPTION OF THE EMBODIMENT

A profile preparation system according to a preferred embodiment of the present invention will be described while referring to the accompanying drawings.

Figure 1:
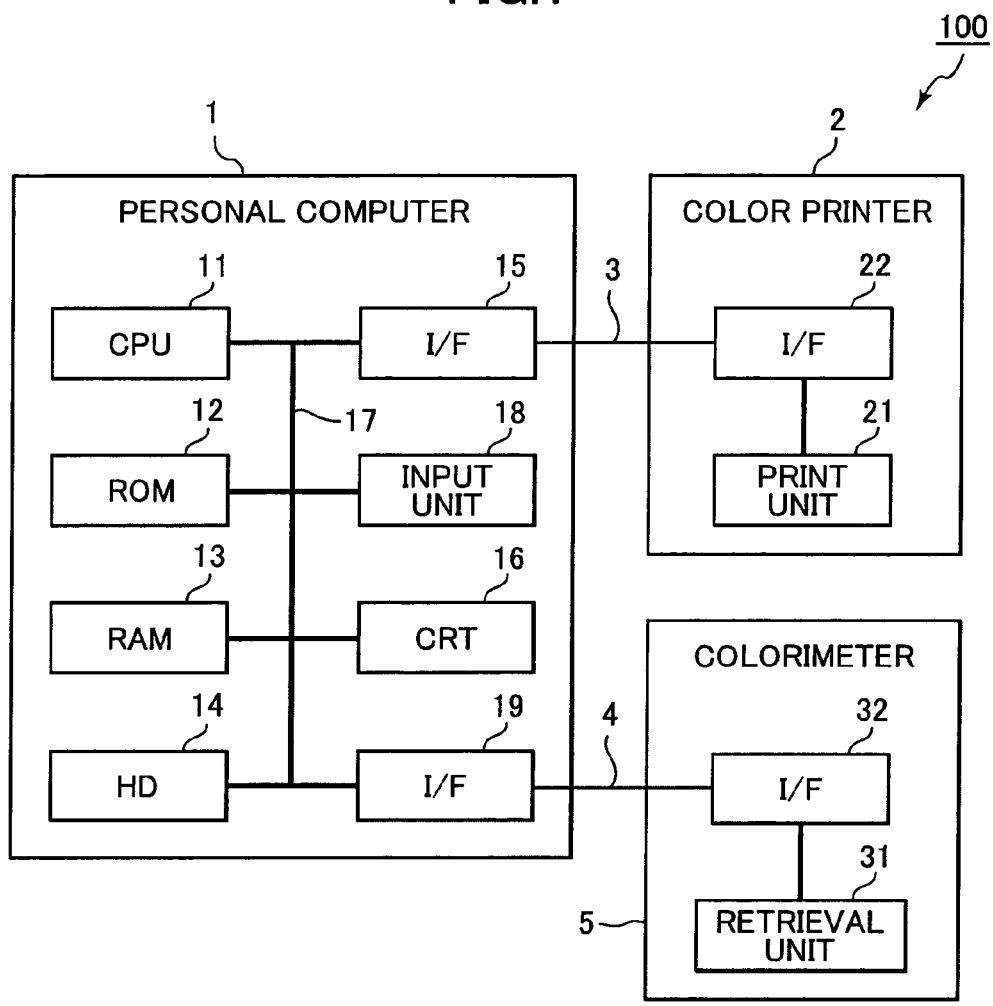
FIG. 1 is a block drawing showing a profile preparation system according to an embodiment of the present invention.

As shown in FIG. 1, the profile preparation system 100 of the present embodiment includes a personal computer 1, a color printer 2, and a calorimeter 5. The personal computer 1, the color printer 2, and the colorimeter 5 are connected together by dedicated interface cables 4, 5 for data transmission.

The personal computer 1 includes a CPU 11, a ROM 12, a RAM 13, a hard disk 14, a printer interface 15, a colorimeter interface 19, a cathode-ray-tube (CRT) display 16, and an input unit 18, such as a mouse and a keyboard, all connected to a bus 17 for mutual data transmission.

The CPU 11 is for executing various control operations and calculation operations according to various programs stored in the ROM 12 and according to other various programs retrieved from the hard disk 14 and stored in the RAM 13. The ROM 12 stores the various control programs, and also various types of data.

The RAM 13 is capable of storing the various programs retrieved from the hard disk 14, and also various data obtained from calculations performed by the CPU 11.

Figure 3:
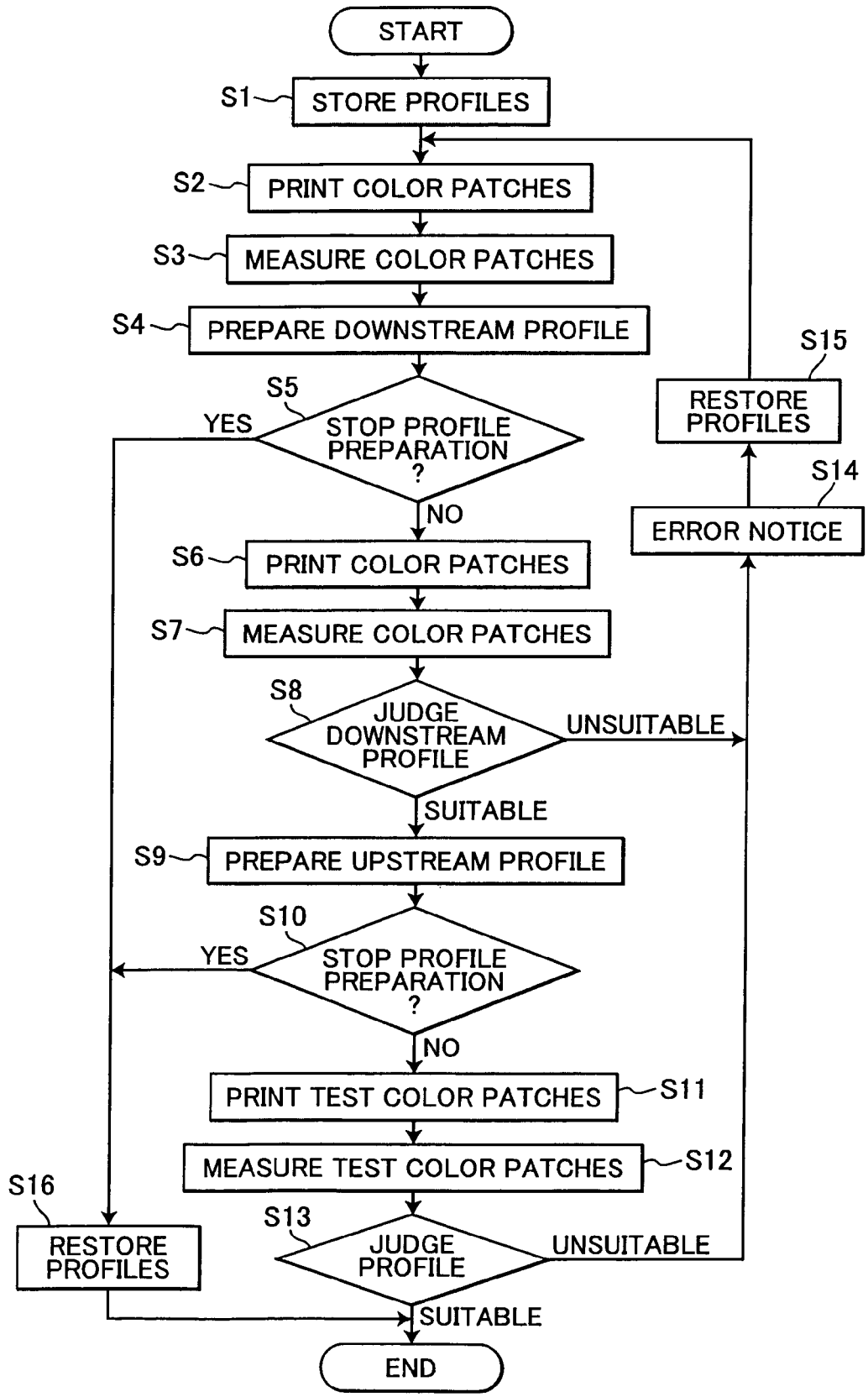
FIG. 3 is a flowchart representing a profile preparation routine performed by the profile preparation system of FIG. 1.

The hard disk 14 serves as an auxiliary storage unit for storing, as files, data and programs which are not stored in main memories such as the ROM 12 or the RAM 13. More specifically, the hard disk 14 stores therein a profile preparation program for executing a profile preparation method (FIG. 3). The hard disk 14 further stores therein an upstream profile U and a downstream profile D which are prepared using the profile preparation program. The upstream profile U is for correcting for changes brought on by passage of time and for unique characteristics of the image recording device 2 itself. The downstream profile D is for more precisely correcting for the changes brought on by passage of time and for the unique characteristics of the image recording device 2.

The input unit 18 includes a mouse and a key board, with which a user can input his/her instruction into the personal computer 1.

The printer interface 15 is for performing two-way data transmission between the computer 1 and the color printer 2 according to a specific transmission protocol agreed upon by the computer 1 and the color printer 2.

The calorimeter interface 19 is for performing two-way data transmission between the computer 1 and the colorimeter 5 according to a specific transmission protocol agreed upon by the computer 1 and the calorimeter 5.

The CRT 16 is for displaying various types of data in a form visually recognizable by the user of the system 100.

The color printer 2 includes an ink-jet type print unit 21 and a PC interface 22. The print unit 21 is capable of performing data transmission with the personal computer 1 through the PC interface 22 and the printer interface 15.

The print unit 21 is of a type that forms images on a recording medium by ejecting inks of cyan (C), magenta (M), yellow (Y), and black (K). The print unit 21 can record multi-tone color images, having density levels of 256 tones for each of four colors, by selectively ejecting dots of the corresponding ink.

The colorimeter 5 includes a retrieval unit 31 and a PC interface 32. The retrieval unit 31 performs transmission of data with the personal computer 1 via the PC interface 32 and the colorimeter interface 19.

The retrieval unit 31 is for measuring the intensity of light transmitted through or reflected from an object, dividing the colors of the object into three primary colors (RGB), and outputting the density level of each color as a measured color database.

The upstream profile U and the downstream profile D are used during an image recording process for recording images as shown in FIG. 2(a). The image recording process of FIG. 2(a) is executed also by the profile preparation system 100.

During the image recording process, a set of image data for the four colors of cyan, magenta, yellow, and black is subjected to a prior process in S50. During the prior process, the image data is corrected according to the upstream profile U. The image data is then subjected to a subsequent process in S60. During the subsequent process, the image data is further corrected according to the downstream profile D. After the subsequent process, the image data is supplied to the printer 2 in S70. As a result, the image data is recorded into a color image. The upstream and downstream profiles U and D can correct for changes brought on by passage of time and for unique characteristics of the image recording device 2 itself. Accordingly, the color image can be recorded in a desirable state by the printer 2.

In order to prepare the upstream and downstream profiles U and D, the profile preparation system 100 executes the profile preparation program, stored in the hard disk 14, to attain a profile preparation process in a manner shown in FIG. 3.

The profile preparation process of FIG. 3 is started when a user of the profile preparation system 100 inputs, via the input unit 18, his/her desire to prepare the upstream profile U and the downstream profile D. The profile preparation process may be executed when the user desires to initially produce the upstream and downstream profiles. The profile preparation process may be executed also when the user desires to update the upstream and downstream profiles presently stored in the hard disk 14. Accordingly, the upstream and downstream profiles U and D can be updated when the characteristics of the printer 2 changes by the passage of time. The upstream and downstream profiles U and D can be updated also when the characteristics of the printer 2 changes for other reasons. For example, the upstream and downstream profiles U and D can be updated when the model of the printer 2 is changed, when the type of image recording medium used is changed, when the type of ink used is changed, when the setting of the resolution is changed, or when the setting of the printing speed is changed.

When the profile preparation process is started, first in S1, the CPU 11 stores data of the presently-existing upstream profile and data of the presently-existing downstream profile. The presently-existing profiles are those that have been prepared prior to the present profile preparation process and that have been stored in the hard disk 14. For example, if the present profile preparation process is executed for the first time after the system 100 is purchased, the presently-existing profiles are those that have been prepared before shipping of the system 100. On the other hand, if the present profile preparation process is performed after the profile preparation process has been performed one or more times after the system 100 is purchased, the presently-existing profiles are those that have been prepared by the user of the system 100 during a latest-performed profile preparation process. It is noted that if the present preparation process is executed to initially prepare the profiles, no profiles are presently existing.

During S1, data of the presently-existing upstream and downstream profiles, which are now stored in the hard disk 14, is copied and stored in the RAM 13. Alternatively, a set of back-up data may be created to store data of the presently-existing profiles, and be stored in some folder or the like. Thus, data of the presently-existing profiles is not erased or cancelled when the present profile preparation process is started. Even when the present profile preparation routine is terminated in the middle of the process as will be described later, data of the presently-existing profiles will be restored and can be used thereafter.

Next, in S2, in order to prepare the downstream profile D, the color printer 2 is controlled to print color patches on a recording medium. For example, nine cyan color patches are produced by cyan (C) ink as shown in FIG. 2(b) based on image data of predetermined nine tone levels of 0, 31, 63, 95, 127, 159, 191, 223, and 255. Similarly, nine magenta color patches are produced by magenta (M) ink based on image data of the predetermined nine tone levels of 0, 31, 63, 95, 127, 159, 191, 223, and 255. Nine yellow color patches are produced by yellow (Y) ink based on image data of the predetermined nine tone levels of 0, 31, 63, 95, 127, 159, 191, 223, and 255. Nine black color patches are produced by black (K) ink based on image data of the predetermined nine tone levels of 0, 31, 63, 95, 127, 159, 191, 223, and 255.

Next, in S3, the calorimeter 5 is controlled to measure the density level of the color patches.

Then, in S4, a downstream profile D is prepared based on the results of measurements taken in S3. For example, the downstream profile D is prepared so that input/output characteristic becomes linear for each color.

When the downstream profile D is prepared in S4, the program proceeds to S5.

In S5, the CPU 11 judges whether the present profile preparation processes should be terminated. This judgement is performed by controlling the CRT display 16 to display a message asking a user whether or not to terminate the present profile preparation processes. If the user inputs, via the input unit 18, his/her confirmation that the present profile preparation processes should be terminated (yes in S5), then the program proceeds to S16. In S16, data of the downstream profile D, which has just been prepared in S4, is restored into the initial state, which has been stored during S1, and the profile preparation processes are ended.

On the other hand, if the present profile preparation processes are to be continued (S5: NO), then in order to judge the properness of the presently-prepared downstream profile D and to prepare the upstream profile U, the color printer 2 is controlled in S6 to print color patches on the recording medium. At this time, for each color, image data for the predetermined nine tone levels of 0, 31, 63, 95, 127, 159, 191, 223, and 255 is first processed in the same manner as in the processes of S60 (FIG. 2(a)) by using the downstream profile D which has just been prepared in S4. Then, the printer 2 is controlled by the processed image data to print nine color patches. As a result, for each color, nine color patches are produced based on the processed image data.

Next, in S7, the calorimeter 5 is controlled to measure the density level of the color patches printed on the recording medium in S6.

Then in S8, the CPU 11 judges whether the prepared downstream profile D is suitable, based on the results of the measurements made in S7. The CPU 11 judges whether or not the prepared downstream profile D is suitable by confirming, for each color, whether the measured density levels of all the nine color patches increase from one to the next color patch in the expected monotone nondecreasing manner. In other words, the CPU 11 judges whether the measured density level of each color patch is higher than or equal to its preceding color patch. The CPU 11 determines that the prepared downstream profile is unsuitable when the measured density level of at least one color patch is smaller than its preceding color patch. The CPU 11 determines that the prepared downstream profile is suitable when the measured density level of each of all the color patches is higher than or equal to its preceding color patch.

Alternatively, the CPU 11 may judge in S8 whether or not the measured density level of each color patch is within a predetermined desirable range for the subject color patch. The CPU 11 determines that the prepared downstream profile is unsuitable when the measured density level of at least one color patch is out of its corresponding desirable range. The CPU 11 determines that the prepared downstream profile is suitable when the measured density level of each of all the color patches is within its corresponding desirable range.

If it is judged in S8 that the prepared downstream profile D is unsuitable (S8: unsuitable), then the program proceeds to S14, in which a notification is made that the downstream profile has been prepared improperly. For example, the CRT display 16 is controlled to display a message that the downstream profile is prepared improperly. Then in S15, the downstream profile D prepared in S4 is restored into the initial state, which has been stored in S1. Afterward, the routine returns to S2, whereupon the series of processes from preparation of the downstream profile D are repeated.

On the other hand, when it is judged that the prepared downstream profile D is suitable (S8: suitable), then the program proceeds to S9, in which the upstream profile U is prepared based on the results of measurements taken in S7.

Once the upstream profile U is prepared in S9, then the program proceeds to S10, in which it is again judged whether or not the present profile preparation processes should be terminated. This process is executed in the same manner as in S5. If the profile preparation processes should be terminated (S10: YES), then the program proceeds to S16, in which data of the presently-prepared downstream and upstream profiles U and D is restored into the initial state, which has been stored in S1. Afterward, the profile preparation processes are ended.

On the other hand, if the profile preparation processes are to be continued (S10: NO), then in S11 the color printer 2 is controlled to print test color patches on the recording medium. More specifically, for each color, image data for the predetermined nine tone values of 0, 31, 63, 95, 127, 159, 191, 223, and 255 is first processed in the same manner as in the process of S50 (FIG. 2(a)) by using the upstream profile U, which has just been prepared in S9, and is then processed in the same manner as in the process of S60 (FIG. 2(a)) by using the downstream profile D, which has just been prepared in S4. Color patches are printed based on the image data thus subjected to the processes according to both of the upstream and downstream profiles U and D. Thus, nine color patches are printed for each color.

Next, in S12, the calorimeter 5 is controlled to measure the density level of each test color patch printed on the recording medium. In S13, the CPU 11 judges whether the prepared upstream and downstream profiles U and D are suitable based on the results of the measurements taken in S12. The judgment made in S13 is performed in the same manner as described for S8. More specifically, the CPU 11 judges whether or not the prepared upstream and downstream profiles are suitable by confirming, for each color, whether or not the measured density levels of all the nine color patches increase from one to the next color patch in the expected monotone nondecreasing manner. The CPU 11 determines that one or both of the prepared upstream and downstream profiles are unsuitable when the measured density level of at least one color patch is smaller than its preceding color patch. The CPU 11 determines that both of the prepared upstream and downstream profiles are suitable when the measured density level of each of all the color patches is higher than or equal to its preceding color patch.

Alternatively, the CPU 11 may judge whether the measured density level of each color patch is within a predetermined desirable range for the subject color patch. The CPU 11 determines that one or both of the prepared upstream and downstream profiles are unsuitable when the measured density level of at least one color patch is out of its corresponding desirable range. The CPU 11 determines that both of the prepared upstream and downstream profiles are suitable when the measured density level of each of all the color patches is within its corresponding desirable range.

If it is judged in S13 that one or both of the upstream and downstream profiles is unsuitable (S13: unsuitable), then the program proceeds to S14. In S14, a notification is made that the one or both of the profiles has been prepared improperly. That is, the CRT 16 is controlled to display a message that one or both of the profiles has been prepared improperly. Then the program proceeds to S15, in which data of the downstream profile D prepared in S4 and data of the upstream profile U prepared in S9 is restored into the initial state, which has been stored in S1. Afterward, the routine returns to S2, whereupon the series of processes are repeated from preparation of the downstream profile D.

On the other hand, when it is judged that both of the upstream and downstream profiles are suitable (S13: suitable), then this series of profile preparation processes is ended. Then, data of the newly-produced upstream and downstream profiles U and D is written over data of the upstream and downstream profiles already stored in the hard disk 14. Data of the newly-produced upstream and downstream profiles may be stored together with indication data indicating that data of the newly-produced upstream and downstream profiles should be retrieved and used during an image recording process of FIG. 2(a) to be executed in the future and during the profile preparation process of FIG. 3 to be executed in the future.

It is noted that according to the present embodiment, the process of S13 is performed only after it is confirmed in S8 that the downstream profile is suitable. Accordingly, if it is judged in S13 that one or both of the upstream and downstream profiles is unsuitable, this normally means that the downstream profile is suitable, but the upstream profile is unsuitable. Accordingly, if it is judged in S13 that one or both of the upstream and downstream profiles is unsuitable, the program may proceed to S9, rather than to S2, after executing the processes of S14 and S15. In this case, the series of preparation processes only for the upstream profile will be repeated.

As described above, according to the profile preparation method of the present embodiment, the profile storing process (S1), the downstream profile preparation process (S2 to S4), the downstream profile judgment process (S6 to S8), the upstream profile preparation process (S6, S7, S9), and the profile judgment process (S11 to S13) are executed. When it is judged in the downstream profile judgment process that the downstream profile has been improperly prepared, or when it is judged in the profile judgment process that one or both of the upstream and downstream profiles has been improperly prepared, then the prepared profile(s) are returned, in S15, to the initial state of when stored in the profile storing process (S1). Afterward, the series of processes from preparing the downstream profile are again executed.

Next will be described one comparative method for preparing the upstream and downstream profiles U and D.

According to this comparative method, color patches are printed on a recording medium based on several sets of predetermined image data. Then, color of each color patch is measured using the calorimeter 5. Then, the downstream profile D is prepared based on the measurement results. Next, several sets of predetermined image data are processed in the same manner as in the subsequent processes of S60 based on the presently-prepared downstream profile D. Then, color patches are recorded based on the thus-processed image data. The color of these patches is measured using the colorimeter 5. Then, the upstream profile U is prepared based on the measurement results.

According to this comparative method, the downstream and upstream profiles D and U are prepared consecutively. Judgement of whether the downstream and upstream profiles are unsuitable is performed after both of the downstream and upstream profiles are prepared. That is, judgement of whether the downstream and upstream profiles are suitable is performed only when the image recording process of FIG. 2(a) is executed to actually use the profiles.

Thus, according to this comparative method, the upstream profile U is always prepared based on the downstream profile D, even when the downstream profile D is prepared inappropriate. In this case, the upstream profile U is also prepared improperly. Therefore, it is impossible to efficiently prepare the interrelated upstream and downstream profiles U and D. Judgement of properness of the profiles is not performed during the profile preparation processes. The only way to check whether profiles have been properly prepared is by actually outputting an image in the normal use mode of FIG. 2(a) after profile preparation processes are completely finished. If the profiles are unsuitable, then the profile preparation processes need to be performed again. This makes it troublesome to prepare proper profiles.

Contrarily, according to the present embodiment, the judgment about whether the prepared downstream profile is suitable or not is made after the downstream profile is prepared, but before the upstream profile is prepared. When the downstream profile is improperly prepared, then the downstream profile is promptly prepared again, without preparing the upstream profile, which is to be influenced by the downstream profile. Therefore, even if the downstream profile is improperly prepared, the profiles can be more efficiently prepared than the comparative manner, wherein the upstream profile is prepared whenever the downstream profile is prepared.

The profile preparation system 100 is designed so that after the upstream profile is prepared, it can be judged whether the prepared upstream and downstream profiles are properly prepared. With this configuration, if at least one of the upstream and downstream profiles has not been properly prepared, then the profile preparation processes will be promptly restarted. The upstream and downstream profiles can be prepared more efficiently, with less trouble, than when using the comparative profile preparation method, wherein whether a profile is properly prepared can only be judged by actually outputting an image using a normal usage mode of FIG. 2(a).

Also, because data of the upstream and downstream profiles, which exist before the profiles are newly prepared, are stored in S1, even if the profiles are not properly prepared, or if profile preparation processes are terminated in the middle of the processes, the profiles can be promptly returned to the initial condition, so that it is ensured that images can be recorded using the initial condition profiles.

The profile preparation method of the present embodiment will be described below in greater detail with reference to a specific example of the upstream profile U and a specific example of the downstream profile D.

Figure 5:
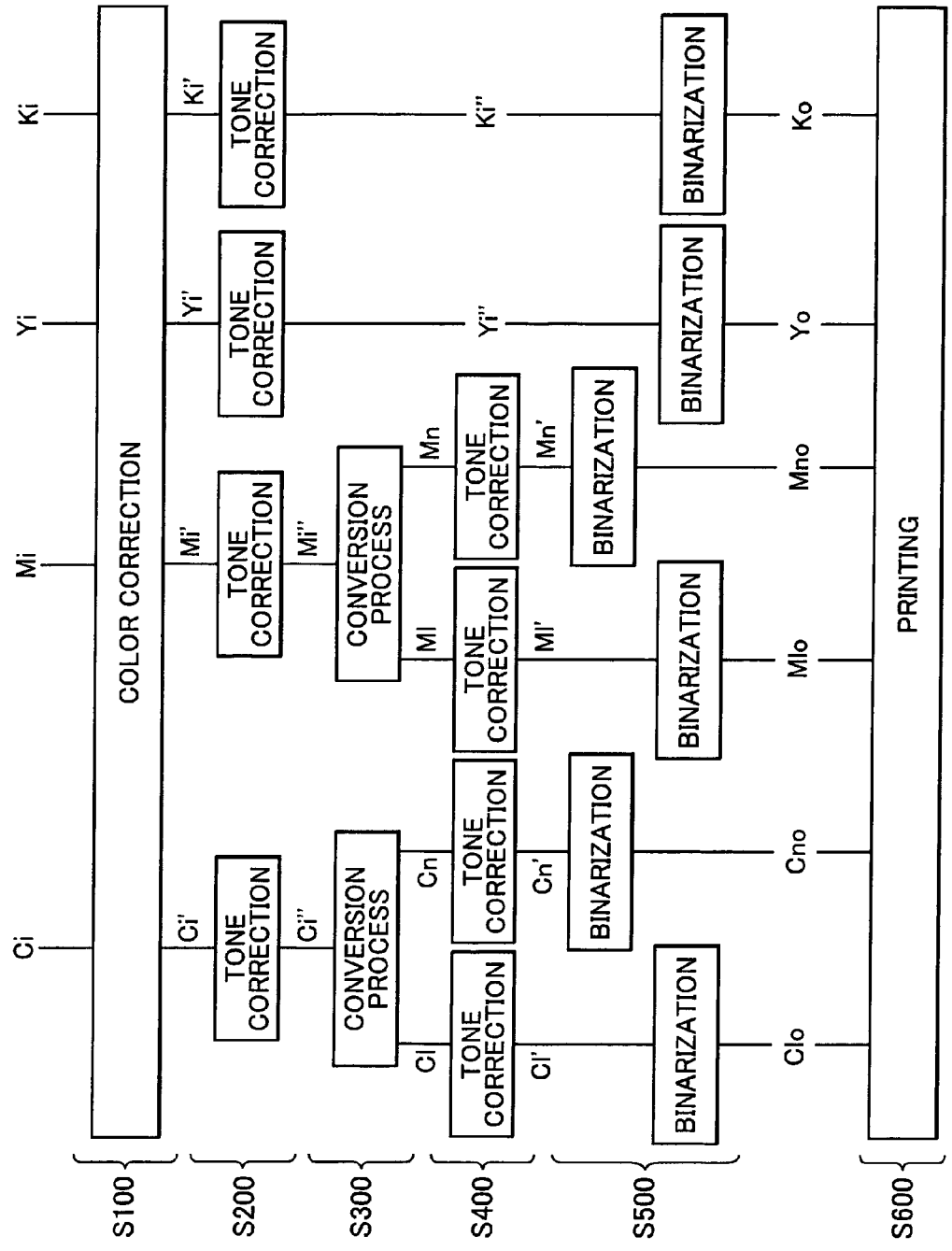
FIG. 5 is a schematic flow diagram showing an image recording process performed by using an example of the upstream profile and the downstream profile of the present embodiment.

The specific example of the upstream profile U and the specific example of the downstream profile D are used in the image recording process of FIG. 5. It is noted that the image recording process of FIG. 5 is executed also by the profile preparation system 100 of the present embodiment.

During the image recording process of FIG. 5, when input color data (Ci, Mi, Yi, Ki) is received from an image preparation application or the like, the input image data (Ci, Mi, Yi, Ki) is color-corrected in S100 into color-corrected color data (Ci', Mi', Yi', Ki') by using a color-correction table T1.

Then, in S200, the cyan component Ci' of the color-corrected color data (Ci', Mi', Yi', Ki') is tone-corrected into color-and-tone-corrected cyan data Ci" by using a tone-correction table T2c for cyan color. The magenta component Mi' is tone-corrected into color-and-tone-corrected magenta data Mi" by using a tone-correction table T2m for magenta color. The yellow component Yi' is tone-corrected into color-and-tone-corrected yellow data Yi" by using a tone-correction table T2y for yellow color. The black component Ki' is tone-corrected into color-and-tone-corrected black data Ki" by using a tone-correction table T2k for yellow color.

Then, in S300, the color-and-tone-corrected cyan data Ci" is converted into light cyan ink data Cl and normal cyan ink data Cn by using a cyan conversion table T3c. The color-and-tone-corrected magenta data Mi" is converted into light magenta ink data Ml and normal magenta ink data Mn by using a magenta conversion table T3m.

Then, in S400, the light cyan ink data Cl is tone-corrected into tone-corrected light cyan ink data Cl' by using a tone-correction table T4cl for light cyan ink. The normal cyan ink data Cn is tone-corrected into tone-corrected normal cyan ink data Cn' by using a tone-correction table T4cn for normal cyan ink. The light magenta ink data Ml is tone-corrected into tone-corrected light magenta ink data Ml' by using a tone-correction table T4ml for light magenta ink. The normal magenta ink data Mn is tone-corrected into tone-corrected normal magenta ink data Mn by using a tone-correction table T4nm for normal magenta ink.

Then, in S500, the tone-corrected ink data Cl', Cn', Ml', Mn' for light cyan, normal cyan, light magenta, and normal magenta, and the color-and-tone-corrected data Yi" and Ki" for yellow and black are binarized into a set of binarized color data (Clo, Cno, Mlo, Mno, Yo, Ko) in a well-known manner, such as described in U.S. Pat. No. 5,045,952.

Then, in S600, the binarized color data (Clo, Cno, Mlo, Mno, Yo, Ko) is outputted to the printer 2, where a desired color image is printed based on the binarized color data (Clo, Cno, Mlo, Mno, Yo, Ko).

In this example, the print unit 21 is of a type that forms images on a recording medium by ejecting six inks of light cyan (Cl), normal cyan (Cn), light magenta (Ml), normal magenta (Mn), yellow (Y), and black (K) based on a set of binary color data (Clo, Cno, Mlo, Mno, Yo, Ko) that is received from the personal computer 1. It is noted that the normal cyan ink has cyan color denser than the light cyan ink. Similarly, the normal magenta ink has magenta color denser than the light magenta ink. The print unit 21 is configured to record multi-tone color images, having density levels of 256 different tones for each of four colors of cyan, magenta, yellow, and black, by selectively ejecting dots of the six inks according to the binary color data (Clo, Cno, Mlo, Mno, Yo, Ko).

It is noted that the tone-correction tables T2c, T2m, T2y, and T2k are the example of the upstream profile U. The tone-correction tables T4cl, T4cn, T4ml, and T4nm are the example of the downstream profile D. The tables T1, T2c, T2m, T2y, and T2k, T3c and T3m, and T4cl, T4cn, T4ml, and T4nm are stored in the hard disk 14.

The color correction table T1 is a look up table used to correct, in S100, input color data (Ci, Mi, Yi, Ki) in order to reproduce colors faithfully by taking into account how respective colors of cyan, magenta, yellow, and black influence one another. As shown in FIG. 6, the color correction table T1 includes a plurality of sets of color data (C, M, Y, K), which are possibly inputtable to the color-correction process of S100. The color correction table T1 includes, in correspondence with each set of color data (C, M, Y, K), a set of color-corrected color data (C', M', Y', K'), which should be outputted from the color-correction process of S100 in response to the input of the subject set of color data (C, M, Y, K).

More specifically, the color correction table T1 includes 6,561 ($=9^4$) sets of color data (C, M, Y, K), wherein C=0, 31, 63, 95, 127, 159, 191, 223, and 255, M=0, 31, 63, 95, 127, 159, 191, 223, and 255, Y=0, 31, 63, 95, 127, 159, 191, 223, and 255, and K=0, 31, 63, 95, 127, 159, 191, 223, and 255. In association with each set of color data (C, M, Y, K), the table T1 includes one set of color-corrected color data (C', M', Y', K') that should be outputted from the process of S100 to reproduce the corresponding color data (C, M, Y, K). Thus, the color correction table T1 is configured as a four-dimensional look up table, in which 6,561 sets of color-correction data (C', M', Y', K') are stored in one to one correspondence with the 6,561 sets of color data (C, M, Y, K).

The tone-correction tables T2c, T2m, T2y, and T2k are provided as the upstream profile U used to correct for changes brought on by passage of time and for unique characteristics of the image recording device 2 itself.

The tone correction tables T2c, T2m, T2y, and T2k are provided in one to one correspondence with the four colors of cyan (C), magenta (M), yellow (Y), and black (K). A tone correction table T2a (a=c, m, y, or k) for each color component, is used to correct, in S200, the tone Ai' (=Ci', Mi', Yi', or Ki') of the corresponding color component in the input color data (Ci', Mi', Yi', Ki'), which has already been color-corrected in S100, into a color-and-tone-corrected value Ai" (=Ci", Mi", Yi" or Ki") so that processes of S200 through S600 will attain a linear "tone characteristic". It is noted that the "tone characteristic" is defined as the density level of an image, to be actually outputted on the recording medium in S600, with respect to the color-corrected tone value Ai' (=Ci', Mi', Yi', or Ki'). The output density is determined by actually measuring the output image using the colorimeter 5.

Figure 7:
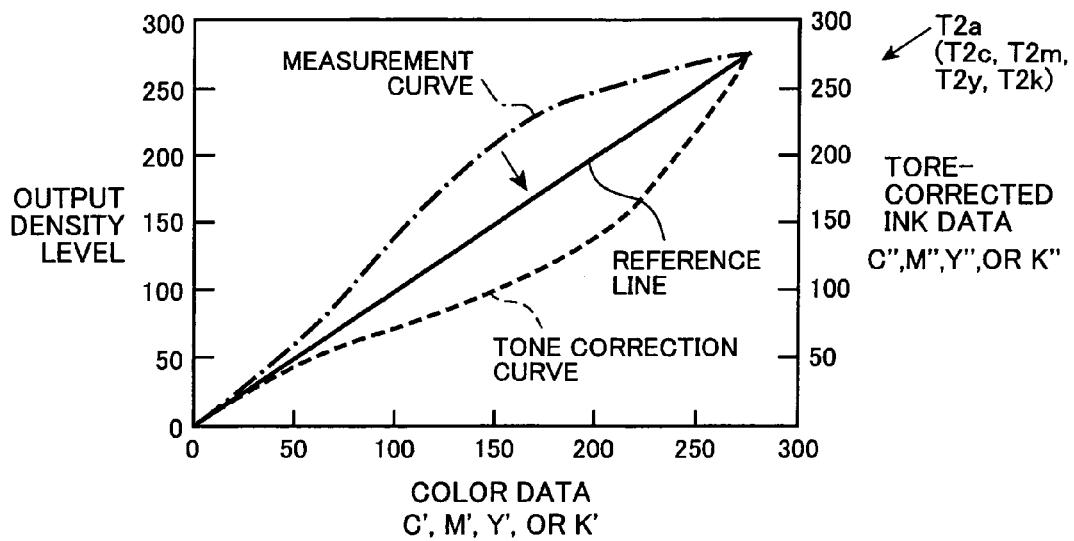
FIG. 7 is graph representing a measurement curve, indicative of a relationship between color data and an output density level, and a tone-correction curve, indicative of a relationship between color data and tone-corrected color data, which is represented by a tone correction table (upstream profile)

It is assumed that when the cyan color component Ci' of color-corrected color data (Ci', Mi', Yi', Ki') from S100 is subjected to the processes of S200-S600, an output density level is obtained in S600 as indicated by a one-dot-and-one-chain line in FIG. 7. In this case, the tone correction table T2c should be prepared to produce an input/output characteristic correction curve, as indicated by a broken line in the figure, to correct for the cyan tone Ci' of the color-corrected color data and to attain a linear input/output characteristic, as indicated by a solid, straight line in the figure.

Accordingly, the tone correction table T2a (a=c, m, y, or k) for each color component A (=C, M, Y, or K) is prepared to include a plurality of sets of color-corrected data A' (=C', M', Y', or K'), which are outputtable from the color-correction process of S100 and are therefore inputtable to the tone-correction process of S200. The tone correction table T2a (a=c, m, y, or k) includes, in correspondence with each set of color-corrected data A' (=C', M', Y', or K'), a set of color-and-tone-corrected data A" (=C", M", Y", or K"), which should be outputted from the tone-correction process of S200 in response to input of the subject set of color-corrected data A' (=C', M', Y', or K').

The tone correction table T2a (a=c, m, y, or k) stores a set of color-and-tone-corrected color data A" (=C", M", Y", or K") for each of a plurality of sets of color-corrected color data A' (=C', M', Y', or K'), which are arranged at a fixed interval. For example, the tone correction table T2a (a=c, m, y, or k) stores a set of color-and-tone-corrected color data A" (=C", M", Y", or K") for each of all the 256 sets of color-corrected color data A' (=C', M', Y', or K') of 0 to 255.

The conversion tables T3c and T3m are provided in one to one correspondence with cyan and magenta colors, each of which is expressed using corresponding light ink and corresponding normal ink. Each conversion table T3a (a=c or m) is used to divide, in S300, color data Ai" (=Ci" or Mi"), which has already been color-corrected in S100 and tone-corrected in S200, into light ink data Al (=Cl or Ml) and normal ink data An (=Cn or Mn) in a conversion characteristic shown in FIG. 8.

The cyan conversion table T3c is comprised from a light cyan conversion table T3cl and a normal cyan conversion table T3cn. The magenta conversion table T3m is comprised from a light magenta conversion table T3ml and a normal magenta conversion table T3nm. For each of cyan and magenta colors, the light ink conversion table T3al (a=c or m) and the normal ink conversion table T3an (a=c or m) are prepared as shown in FIGS. 9 (a) and 9 (b) to represent the conversion characteristic of FIG. 8.

Each of the conversion tables T3an and T3al (a=c or m) includes a plurality of sets of color-and-tone-corrected data A" (=C" or M"), which are outputtable from the tone-correction process of S200 and are therefore inputtable to the conversion process of S300. The light ink conversion table T3al (a=c or m) includes, in correspondence with each set of color-and-tone-corrected data A" (=C" or M"), a set of light ink data B (=Cl or Ml), which should be outputted from the conversion process of S300 in response to input of the subject set of color-and-tone-corrected data A" (=C" or M"). The normal ink conversion table T3an (a=c or m) includes, in correspondence with each set of color-and-tone-corrected data A" (=C" or M"), a set of normal ink data B (=Cn or Mn), which should be outputted from the conversion process of S300 in response to input of the subject set of color-and-tone-corrected data A" (=C" or M").

Figure 8:
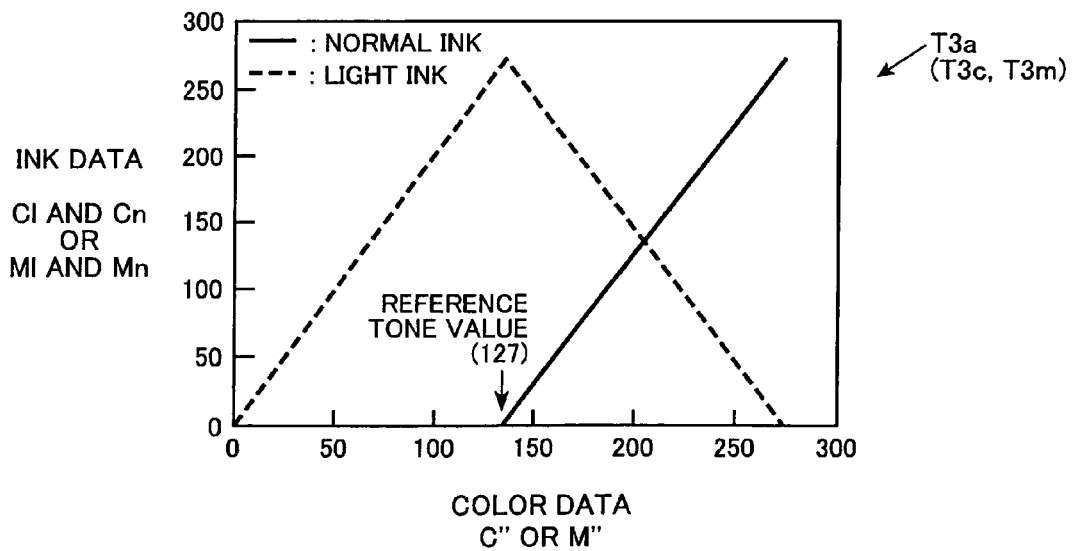
FIG. 8 is a graph representing a relationship between color data, for each of two basic colors of magenta and cyan, and corresponding light ink data and normal ink data.

It is noted that according to the conversion characteristic of FIG. 8, in order to reproduce each of cyan and magenta colors, when the tone value of the color-and-tone-corrected data A" (=C" or M") is smaller than a predetermined reference tone value (127, for example), only light ink is used to reproduce the tone by changing the dot recording density of light ink. Normal ink starts being used when the tone value of the color-and-tone-corrected data A" (=C" or M") reaches the reference tone value (127). Once the reference tone value is reached, the tone is reproduced by gradually (linearly) reducing the dot recording density of light ink while gradually (linearly) increasing the dot recording density of normal ink in association with increase in the tone value of the color-and-tone-corrected data A" (=C" or M").

The tone-correction tables T4cl, T4cn, T4ml, and T4nm are provided as the downstream profile D used to more precisely correct for changes brought on by passage of time and for unique characteristics of the image recording device 2 itself, than the tone-correction tables T2c and T2m.

The tone correction tables T4cl, T4cn, T4ml, and T4mn are provided in one to one correspondence with the four inks of light cyan (Cl), normal cyan (Cn), light magenta (Ml), and normal magenta (Mn). A tone correction table T4b(b=cl, cn, ml, or mn) for each ink, is used to correct, in S400, ink data B (=Cl, Cn, Ml, or Mn), which has been obtained in S300, into a tone-corrected ink data B' (=Cl', Cn', Ml', or Mn') so that processes of S400 through S600 will attain a linear "tone characteristic". It is noted that the "tone characteristic" is defined as the density level of an image, to be actually outputted on the recording medium in S600, with respect to the ink data B (=Cl, Cn, Ml, or Mn). The output density is determined by actually measuring the output image using the colorimeter 5.

Figure 10:
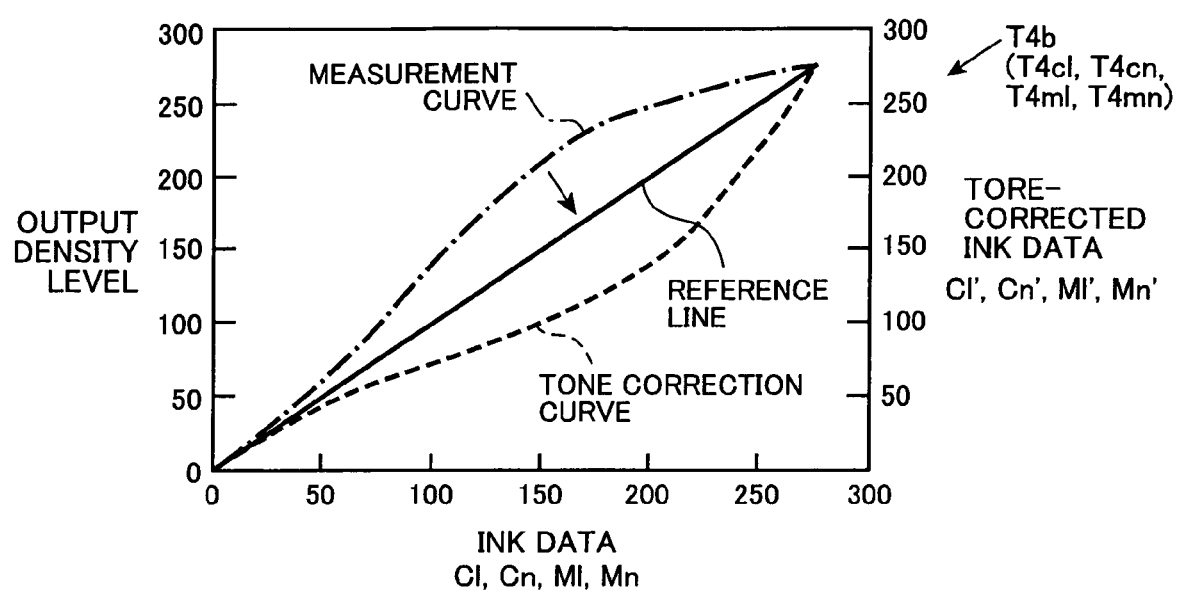
FIG. 10 is graph representing a measurement curve, indicative of a relationship between ink data and an output density level, and a tone-correction curve, indicative of a relationship between ink data and tone-corrected ink data, which is represented by another tone correction table (downstream profile).

It is assumed that when light cyan ink data Cl from S300 is subjected to the processes of S400-S600, an output density level is obtained in S600 as indicated by a one-dot-and-one-chain line in FIG. 10. In this case, the tone correction table T4cl should be prepared to produce an input/output characteristic correction curve, as indicated by a broken line in the figure, to correct for the light cyan value Cl and to attain a linear input/output characteristic, as indicated by a solid, straight line in the figure.

Accordingly, the tone correction table T4$b$ (b=cl, cn, ml, or mn) is prepared to include a plurality of sets of ink data B (=Cl, Cn, Ml, or Mn), which are outputtable from the conversion process of S300 and are therefore inputtable to the tone-correction process of S400. The tone correction table T4$b$(b=cl, cn, ml, or mn) includes, in correspondence with each set of ink data B (=Cl, Cn, Ml, or Mn), a set of tone-corrected data B' (=Cl', Cn', Ml', or Mn'), which should be outputted from the tone-correction process of S400 in response to input of the subject set of ink data B (=C1, Cn, Ml, or Mn).

The tone correction table T4$b$ (b=cl, cn, ml, or mn) stores a set of tone-corrected ink data B' (=Cl', Cn', Ml', or Mn') for each of a plurality of sets of ink data B (=Cl, Cn, Ml, or Mn) which are arranged at a fixed interval. For example, the tone correction table T4$b$ (b=cl, cn, m1, or nm) stores a set of tone-corrected ink data B' (=Cl', Cn', Ml', or Mn') for each of all the 256 sets of ink data B (=Cl, Cn, Ml, or Mn) of 0 to 255.

Data of the color-correction table T1, the conversion tables T3$cl$, T3$cn$, T3$ml$, and T3$nm$, the tone-correction tables T2$c$, T2$m$, T2$y$, and T2$k$ (upstream profile U), and the tone-correction tables T4$cl$, T4$cn$, T4$ml$, and T4$nm$ (downstream profile D) are produced in advance, and stored in the hard disk 14.

Next will be described how to produce the color correction table T1, the tone correction tables T2$c$, T2$m$, T2$y$, and T2$k$, the conversion tables T3$cl$, T3$cn$, T3$ml$ and T3$mn$, and the tone correction tables T4$cl$, T4$cn$, T4$ml$, and T4$mn$. It is noted that the tone correction tables T4$b$ (b=cl, cn, ml, and mn), the conversion tables T3$al$ and T3$an$ (a =c and m), the tone correction tables T2$a$ (a=c, m, y, and k), and the color correction table T1 are prepared in this order.

First will be described how to prepare the tone correction table T4$cl$ for light cyan ink.

It is noted that the tone correction tables T4$cn$, T4$ml$, and T4$mn$ are prepared for normal cyan ink, light magenta ink, and normal magenta ink in the same manner as described below for light cyan ink.

First, nine sets of light cyan ink data Cl of 0, 31, 63, 95, 127, 159, 191, 223, and 255, which will be possibly inputted into the tone-correction process of S400, are prepared. Each set of ink data Cl is subjected to no tone-correction process of S400. As a result, nine sets of ink data Cl' having the same tone values 0, 31, 63, 95, 127, 159, 191, 223, and 255 are obtained.

Then, the print unit 21 is controlled by the nine sets of light cyan ink data Cl' to print nine single-color color patches on a recording medium using light cyan ink. That is, each set of ink data Cl' is binarized in the same manner as in the process of S500, and supplied to the printer 2. As a result, nine color patches are produced as shown in FIG. 2($b$). Then, the output density level of each color patch is measured using the colorimeter 5.

A graph of FIG. 10 is then prepared, in which the horizontal axis indicates ink data Cl in the range of 0-255, a left-hand vertical axis indicates the measured density levels in the range of 0-255, and a right-hand vertical axis indicates tone-corrected levels Cl' of 0-255 to be obtained. Based on the measurement results of the nine color patches, a measurement curve is prepared, as indicated by a one-dot-and-one-chain line in the figure, to represent the relationship between the ink data Cl (horizontal axis) and the measured density values (left-hand vertical axis). A predetermined reference line is then plotted in the same graph to connect the minimum tone point (0, 0) and the maximum tone point (255, 255) as indicated by a solid line in the figure. Then, as indicated by a broken line in the same figure, a tone-correction curve is calculated as a curve that is symmetrical to the measurement curve with respect to the reference line. The tone-correction curve is then set as a tone-correction table T4$cl$. That is, along the tone-correction curve, the value of tone-corrected data Cl', defined along the right-hand vertical axis, is determined for each of a plurality of values of ink data Cl, defined along the horizontal axis.

It is noted that the measurement results of the color patches show that when ink data Cl is subjected to the color reproducing characteristic of S500-S600, represented by the measurement curve (one-dot-and-one-chain line in FIG. 10), the ink data Cl is converted into the output density level plotted on the measurement curve. The tone-correction curve (broken line in FIG. 10) is therefore determined so that when any ink data Cl is actually inputted, the ink data Cl will be subjected first to the tone correction characteristic of S400, represented by the tone-correction curve, and then to the color reproducing characteristic of S500-S600, represented by the measurement curve, resulting in the output density levels on the linear reference line. Accordingly, actually-inputted color data Cl will be converted through S400-S600 to the output density levels with a linear conversion characteristic, which is a combination of the tone correction characteristic of S400, represented by the tone-correction curve (broken line in FIG. 10), and the color reproducing characteristic of S500-S600, represented by the measurement curve (one-dot-and-one-chain line in FIG. 10).

Next will be described how to prepare the conversion tables T3$cn$ and T3$cl$ for cyan color. It is noted that the conversion tables T3$nm$ and T3$ml$ for magenta color are prepared in the same manner as described below for cyan color.

First, the reference tone value is set to a desirable value ("127," in this example). The reference tone value is defined as a tone level point C", from which normal ink will be used.

Next, the value of normal ink data Cn for the reference tone value C" of 127 is determined as a desirable value ("1," for example). This value indicates the amount of normal ink that should be ejected, together with light ink, to reproduce the reference tone value C" of 127.

Then, the value of light ink data Cl for the reference tone value C" of 127 is determined in a trial-and-error manner described below. It is noted that this value indicates the amount of light ink that should be ejected, together with normal ink, to reproduce the reference tone value C" of 127.

First, the print unit 21 is controlled to produce a plurality of single-color color patches by ejecting light ink on a recording medium based on a plurality of tone levels that differ from one another in stepwise increments. More specifically, a plurality of sets of light ink data C1 are prepared so that the plurality of sets of ink data have a plurality of tone levels that are different from one another in stepwise increments. The plural sets of ink data are tone-corrected in the same manner as in the process of S400 by using the table T4$cl$, which has been already prepared for light cyan ink, binarized in the same manner as in the process of S500, and supplied to the printer 2. As a result, the plurality of single-color color patches are produced by light cyan ink in stepwisely-increasing dot recording densities.

Then, the print unit 21 is controlled to eject normal ink, onto each single-color color patch, based on the tone level ("1" in this example) that is already determined for the reference tone level C" of 127. More specifically, one set of normal ink data Cn of 1 is prepared, tone-corrected in the same manner as in the process of S400 by using the table T4cn, binarized in the same manner as in the process of S500, and supplied to the printer 2. As a result, each single-color color patch is further printed with normal ink at a dot recording density that corresponds to the tone level of "1".

Then, the plurality of single-color color patches are visually observed by an operator to select one or more allowable color patches where normal ink dot "roughness" appear unnoticeable. Then, one color patch is selected that has been printed with the lowest tone level of light ink among the selected one or more allowable color patches. The tone level of the thus selected one color patch is determined as the lowest allowable light ink amount for the reference tone level C" of 127.

The print unit 21 is further controlled to produce a plurality of mixed-color color patches by ejecting four inks of: light cyan ink, light magenta ink, yellow ink, and black ink, at a plurality of tone levels that are different from one another in stepwise increments. Each color patch is produced according to the same tone level for all of the four inks. More specifically, a plurality of sets of color data (Cl, Ml, Y", K") are prepared. The plurality of sets of color data have a plurality of tone levels that are different from one another in stepwise increments. Each data set has the same tone value for all the four color components Cl, Ml, Y", and K". The yellow and black components Y" and K" are binarized in the same manner as in the process of S500, and supplied to the printer 2. The cyan and magenta components Cl and Ml are tone-corrected in the same manner as in the processes of S400 by using the tables T4cl and T4ml, binarized in the same manner as in the process of S500, and supplied to the printer 2. As a result, a plurality of mixed-color color patches are produced by all the four inks in stepwisely-increasing dot recording densities.

Then, the plurality of mixed-color color patches are visually observed by the operator to select one or more allowable color patches where no bleeding appear in cyan or magenta light ink. One color patch is then selected that has printed with the highest tone level among the selected one or more allowable color patches. The tone level of the thus selected one color patch is determined as the highest allowable light ink amount for the reference tone level C" of 127.

When the thus determined highest allowable light ink amount is equal to the determined lowest allowable light ink amount, the highest or lowest allowable light ink amount is determined as light ink tone data Cl that should be outputted in S300 for the reference tone level C" of 127. Accordingly, the highest or lowest allowable light ink amount is determined as light ink data Cl for the reference tone C" of 127. In this example, as shown in FIGS. 8 and 9(a), light ink data Cl is determined as "255" with respect to the reference tone value C" of 127.

On the other hand, when the determined highest and lowest allowable light ink amounts are not equal to each other, observations of the single-color color patches and of the mixed-color color patches are performed again to reselect allowable color patches in a lower precision so that the lowest and highest allowable light ink amounts will become equal to each other.

Next, the value of light ink data Cl is determined for all the remaining tone values C" of 0-126 and 128-255.

First, the value of light ink data Cl is determined as "0" for color data C" of the minimum and maximum tone values of 0 and 255. Then, as shown in FIG. 8, a graph is prepared in which the horizontal axis denotes color data C" in the range of 0 to 255, and the vertical axis denotes light ink data and normal ink data both in the range of 0 to 255. Then, as indicated by a broken line in FIG. 8, a linearly increasing-and-then-decreasing line is prepared to connect the light ink minimum-tone point (0, 0) to the light ink reference-tone point (127, 255) and further to the light ink maximum-tone point (255, 0). Along this linearly increasing-and-decreasing line, the value of light ink data Cl, defined along the vertical axis, is determined for all of the 256 color data C" of 0, 1, ..., 255 defined along the horizontal axis. As a result, light ink data Cl is determined as shown in FIG. 9(a) with respect to all of the tone values of 0-255 of color data C".

Next, the value of normal ink data is determined for all of the remaining tone values of 0-126 and 128-255 of color data C" in a trial-and-error manner described below. It is noted that the value of normal ink data Cn is already determined as "1", for the reference tone value C" of 127.

First, the value of normal ink data Cn is determined as "0" for all the tone values C" of 0-126 that are smaller than the reference tone value 127.

Then, the value of normal ink data is determined for the maximum tone value C" of 255 in a manner described below.

First, the print unit 21 is controlled to produce a plurality of single-color color patches by ejecting normal ink on a recording medium based on a plurality of tone levels that differ from one another in stepwise increments. More specifically, a plurality of sets of normal ink data Cn are prepared so that the plurality of sets of ink data have a plurality of tone levels that are different from one another in stepwise increments. The plural sets of ink data are tone-corrected in the same manner as in the processes of S400 by using the table T4cn, binarized in the same manner as in the process of S500, and supplied to the printer 2. As a result, the plurality of single-color color patches are produced by normal ink in stepwisely-increasing dot recording densities.

Then, the print unit 21 is controlled to eject light ink, onto each single-color color patch, based on the tone level of light ink that is already determined for the maximum tone level C" of 255. In this example, the tone level is already determined as "0" for the maximum level C" of 255. Accordingly, one set of light ink data Cl of "0" is prepared, tone-corrected in the same manner as in the process of S400 by using the table T4cl, binarized in the same manner as in the process of S500, and supplied to the printer 2.

Then, the plurality of single-color color patches are visually observed by the operator to select one or more allowable color patches where no undesirable white regions appear noticeable. One color patch is then selected that has printed with the lowest tone level of normal ink among the selected one or more allowable color patches. The tone level of this color patch is determined as the lowest allowable normal ink amount for the maximum tone level C" of 255.

Next, the print unit 21 is controlled to produce a plurality of mixed-color color patches by ejecting four inks of: normal cyan ink, normal magenta ink, yellow ink, and black ink, at a plurality of tone levels that are different from one another in stepwise increments. Each color patch is produced according to the same tone level for all of the four inks. More specifically, a plurality of sets of color data (Cn, Mn, Y", K") are prepared. The plurality of sets of color data have a plurality of tone levels that are different from one another in stepwise increments. Each data set has the same tone value for all the four color components Cn, Mn, Y", and K". The yellow and black components Y" and K" are binarized in the same manner as in the process of S500, and supplied to the printer 2. The cyan and magenta components Cn and Mn are tone-corrected in the same manner as in the processes of S400 by using the tables T4cn and T4nm, binarized in the same manner as in the process of S500, and supplied to the printer 2. As a result, the plurality of mixed-color color patches are produced by the four inks in stepwisely-increasing dot recording densities.

Then, the plurality of mixed-color color patches are visually observed by the operator to select one or more allowable color patches where no bleeding or blurring appear in the cyan or magenta normal ink. One color patch is then selected that has printed with the highest tone level among the selected one or more allowable color patches. The tone level of the thus selected one color patch is determined as the highest allowable normal ink amount for the maximum tone level C" of 255.

When the thus determined highest allowable normal ink amount is equal to the determined lowest allowable normal ink amount, the highest or lowest allowable normal ink amount is determined as normal ink tone data Cn that should be outputted from S300 for the maximum tone level C" of 255. Accordingly, the highest or lowest allowable normal ink amount is determined as normal ink data Cn for the maximum tone C" of 255. In this example, as shown in FIGS. 8 and 9(b), normal ink data Cn is determined as "255" with respect to the maximum tone value C" of 255.

On the other hand, when the determined highest and lowest allowable normal ink amounts are not equal to each other, observations of the single-color color patches and of the mixed-color color patches are performed again to reselect allowable color patches in a lower precision so that the lowest and highest allowable normal ink amounts will become equal to each other.

Next, the value of normal ink data Cn is determined for all the remaining tone values C" of 128-254.

As indicated by a solid line in FIG. 8, a linearly increasing line is produced to connect the normal ink reference-tone point (127, 1) to the normal ink maximum-tone point (255, 255). Along this linearly-increasing line, the value of normal ink data Cn, defined along the vertical axis, is determined for each of all the values of color data C" of 128, 129, 130, . . . , 253, and 254, defined along the horizontal axis. Thus, the value of normal ink data Cn with respect to all the tone values C" of 127-255 is determined and stored as shown in FIG. 9(b).

Next will be described how to prepare the tone correction table T2c for cyan color. It is noted that the tone correction table T2m is prepared for magenta color in the same manner as described below for cyan color.

First, nine sets of color data C' of 0, 31, 63, 95, 127, 159, 191, 223, and 255 which will be possibly inputted into the tone-correction process of S200, are prepared. Each set of color data C' is subjected to no tone-correction process of S200. As a result, nine sets of color data C" having the tone values 0, 31, 63, 95, 127, 159, 191, 223, and 255 are obtained. Then, the nine sets of color data C" are subjected to the conversion process of S300. As a result, each set of color data C" is converted into normal ink data Cn and light ink data Cl by using the conversion tables T3cn and T3cl, which have already been produced. Thus, nine sets of color data C' are directly converted into nine sets of ink data (Cn, Cl). Then, the nine sets of ink data (Cn, Cl) are subjected to the tone-correction process of S400. As a result, each set of ink data (Cn, Cl) is tone-corrected into a set of tone-corrected ink data (Cn', Cl') by using the tone-correction tables T4cn and T4cl, which have already been produced. Thus, the nine sets of ink data (Cn, Cl) are tone-corrected into nine sets of ink data (Cn', Cl').

Then, the print unit 21 is controlled by the nine sets of ink data (Cn', Cl') to print nine single-color color patches on a recording medium using both light and normal inks. That is, each set of ink data (Cn', Cl') is binarized in the same manner as in the process of S500, and supplied to the printer 2. As a result, nine color patches are produced as shown in FIG. 2(b). Then, the output density level of each color patch is measured using the colorimeter 5.

A graph of FIG. 7 is then prepared, in which the horizontal axis indicates color data C' in the range of 0-255, a left-hand vertical axis indicates the measured density levels in the range of 0-255, and a right-hand vertical axis indicates tone-corrected levels C" of 0-255 to be obtained. Based on the measurement results of the nine color patches, a measurement curve is prepared, as indicated by a one-dot-and-one-chain line in the figure, to represent the relationship between the color data C' (horizontal axis) and the measured density values (left-hand vertical axis). A predetermined reference line is then plotted in the same graph to connect the minimum tone point (0, 0) and the maximum tone point (255, 255) as indicated by a solid line in the figure. Then, as indicated by a broken line in the same figure, a tone-correction curve is calculated as a curve that is symmetrical to the measurement curve with respect to the reference line. The tone-correction curve is then set as a tone-correction table T2c. That is, along the tone-correction curve, the value of tone-corrected data C", defined along the right-hand vertical axis, is determined for each of a plurality of values of color data C', defined along the horizontal axis.

It is noted that the measurement results of the color patches show that when color data C' is subjected to the color reproducing characteristic of S300-S600, represented by the measurement curve (one-dot-and-one-chain line in FIG. 7), the color data C' is converted into the output density level plotted on the measurement curve. The tone-correction curve (broken line in FIG. 7) is therefore determined so that when any color data C' is actually inputted, the color data C' will be subjected first to the tone correction characteristic of S200, represented by the tone-correction curve, and then to the color reproducing characteristic of S300-S600, represented by the measurement curve, resulting in the output density levels on the linear reference line. Accordingly, actually-inputted color data C' will be converted through S200-S600 to the output density levels with a linear conversion characteristic, which is a combination of the tone correction characteristic of S200, represented by the tone-correction curve (broken line in FIG. 7), and the color reproducing characteristic of S300-S600, represented by the measurement curve (one-dot-and-one-chain line in FIG. 7).

Next will be described how to prepare the tone correction table T2y for yellow color. It is noted that the tone correction table T2k is prepared for black color in the same manner as described below for yellow color.

The print unit 21 is first controlled according to nine sets of color data Y' of 0, 31, 63, 95, 127, 159, 191, 223, and 255 to produce nine color patches. More specifically, nine sets of yellow color data Y' of 0, 31, 63, 95, 127, 159, 191, 223, and 255 are prepared, binarized in the same manner as in the process of S500, and are supplied to the printer 2. As a result, nine color patches are produced by yellow ink as shown in FIG. 2(b). Densities of the nine color patches are measured by the calorimeter 5. As a result, a measurement curve (one-dot-and-one-chain line) of FIG. 7 is produced based on the measurement results similarly as described above for cyan ink. A predetermined reference line (solid line) and a tone-correction curve (broken line) are determined also in the same manner as described above. The thus obtained tone-correction curve (broken line) is set as the tone-correction table T2$y$ for the yellow color.

Next will be described how to prepare the color-correction table T1.

First, 6,561 (=9$^4$) sets of color data (C', M', Y', K'), which will possibly be outputted from the color-correction process of S100, are prepared, wherein C=0, 31, 63, 95, 127, 159, 191, 223, and 255, M=0, 31, 63, 95, 127, 159, 191, 223, and 255, Y=0, 31, 63, 95, 127, 159, 191, 223, and 255, and K=0, 31, 63, 95, 127, 159, 191, 223, and 255. The yellow component Y' of each set of color data (C', M', Y', K') is tone-corrected into tone-corrected data Y" in the same manner as in the process of S200 using the tone-correction table T2$y$ already prepared for yellow color in the manner described above. Similarly, the black component K' of each set of color data (C', M', Y', K') is tone-corrected into tone-corrected data K" in the same manner as in the process of S200 using the tone-correction table T2$k$ already prepared for black color. The cyan component C' of each set of color data (C', M', Y', K') is tone-corrected into tone-corrected data C" in the same manner as in the process of S200 using the tone-correction table T2$c$ already prepared for cyan color, converted in the same manner as in the process of S300 into light ink data Cl and normal ink data Cn using the conversion tables T3$cl$ and T3$cn$ already prepared for cyan color, and are tone-corrected in the same manner as in the process of S400 into tone-corrected ink data Cl' and Cn' using the tone-correction tables T4$cl$ and T4$cn$ already prepared for cyan color. Similarly, the magenta component M' of each set of color data (C', M', Y', K') is tone-corrected into tone-corrected data M" in the same manner as in the process of S200 using the tone-correction table T2$m$ already prepared for magenta color, converted in the same manner as in the process of S300 into light ink data Ml and normal ink data Mn using the conversion tables T3$ml$ and T3$mn$ already prepared for magenta color, and are tone-corrected in the same manner as in the process of S400 into tone-corrected ink data Ml' and Mn' using the tone-correction tables T4$ml$ and T4$mn$ already prepared for magenta color. Thus, each set of color data (C', M', Y', K') is converted into a set of color data (Cl', Cn', Ml', Mn', Y"', K"). The set of color data (Cl', Cn', Ml', Mn', Y"', K") is then binarized into binarized data (Clo, Cno, Mlo, Mno, Yo, Ko) in the same manner as in the process of S500, and is supplied to the printer 2. As a result, the print unit 21 is controlled to produce 6,561 color patches.

The color patches are measured using the colorimeter 5 in order to determine L*a*b* color values (L, a, b), defined in the L*a*b* calorimetric system (CIE 1976), for all the sets of original color data (C', M', Y', K'). Interpolation calculation is performed on the measured L*a*b* color values and the original color values (C', M', Y', K') to determine a relationship between a plurality of Lab color values (L, a, b) and a plurality of color values (C', M', Y', K'), which are to be outputted from the color-correction process of S100

Next, the relationship between color values (C, M, Y, K), which are inputtable to the color correction process of S100, and L*a*b* color values (L, a, b) is determined. More specifically, 6,561 sets of color data (C, M, Y, K), which will possibly be inputted to the color correction process of S100, are prepared, wherein C=0, 31, 63, 95, 127, 159, 191, 223, and 255, M=0, 31, 63, 95, 127, 159, 191, 223, and 255, Y=0, 31, 63, 95, 127, 159, 191, 223, and 255, and K=0, 31, 63, 95, 127, 159, 191, 223, and 255. Each set of color data (C, M, Y, K) is outputted, without being subjected to any correction or conversion process, to a standard printer to produce 6,561 color patches. The color patches are measured by a colorimeter to obtain the L*a*b color values (L, a, b) of the color patches. Interpolation calculation is performed on the measured L*a*b* color values and the original color values (C, M, Y, K) to determine a relationship between a plurality of color values (C, M, Y, K), which are to be inputted to the color-correction process of S100, and a plurality of Lab color values (L, a, b). It is noted that the relationship between color data (C, M, Y, K) and the L*a*b color values (L, a, b) can be determined also based on a (CMYK-Lab) look up table that is supplied from Pantone Corporation or SWOP (Standard Wet Offset Printing). As a result, the relationship among color data (C, M, Y, K), to be inputted to the process of S100, L*a*b* color data (L, a, b), and color-corrected color data (C', M', Y', K'), to be outputted from the process of S100, is obtained. Therefore, a direct relationship between color data (C, M, Y, K) and color-corrected color data (C', M', Y', K') is obtained. Thus, the color correction table T1 is obtained.

It is noted that the color correction table T1 may be produced in a manner described in U.S. Pat. No. 4,500,919.

Because the tables T1, T2 (T2$c$, T2$m$, T2$y$, and T2$k$), T3 (T3$cl$, T3$cn$, T3$ml$, and T3$mn$), and T4 (T4$cl$, T4$cn$, T4$ml$, and T4$mn$) are prepared as described above, the image conversion process of FIG. 5 is performed using those tables in a manner described below.

In S100, input color data (Ci, Mi, Yi, Ki), prepared in an image preparation application or the like, is color-corrected into color-corrected color data (Ci', Mi', Yi', Ki') using the color correction table T1. More specifically, if input color data (Ci, Mi, Yi, Ki) matches with some set of color data (C, M, Y, K) in the color correction table T1, the input color data (Ci, Mi, Yi, Ki) is directly color-corrected into a set of color-corrected color data (Ci', Mi', Yi', Ki') that is stored in the color correction table T1 in correspondence with the matching color data (C, M, Y, K). On the other hand, if the input color data (Ci, Mi, Yi, Ki) matches with no color data (C, M, Y, K) in the color correction table T1, then a set of approximate color-corrected data (Ci', Mi', Yi', Ki') is calculated by interpolating several sets of color-corrected data (C', M', Y', K'), which are stored in the table T1 for several sets of color data (C, M, Y, K) that surround the subject set of input color data (Ci, Mi, Yi, Ki). Thus, each set of input color data (Ci, Mi, Yi, Ki) is color-corrected into color-corrected color data (Ci', Mi', Yi', Ki') so as to be suitably reproduced by a combination of four colors of cyan, magenta, yellow, and black.

Then, in S200, using the tone correction tables T2$c$, T2$m$, T2$y$, and T2$k$, values of color data (Ci', Mi', Yi', Ki'), which has already been subjected to the color correction processes of S100, are subjected to tone correction. During the tone correction process for cyan component, the value Ci' of the color-corrected input color data (Ci', Mi', Yi', Ki') is used to refer to the horizontal axis in the tone-correction table T2$c$ (FIG. 7) for cyan color. Then, with respect to the color-corrected data Ci' (horizontal axis), the value of tone-corrected color data Ci" (right-hand vertical axis) on the tone-correction curve is obtained. Thus, a color-and-tone-corrected color data Ci" is obtained for the color-corrected color data Ci'. The same operation is performed for other remaining values Mi', Yi', and Ki' by using the tone-correction tables T2$m$, T2$y$, and T2$k$ (FIG. 7) for magenta, yellow, and black colors. As a result, one set of color-and-tone-corrected color data (Ci", Mi", Yi", Ki") is produced based on each set of color-corrected color data (Ci', Mi', Yi', Ki').

Then, in S300, using the conversion tables T3*cl* and T3*cn* for cyan color, the value Ci" is converted into values Cl and Cn. Similarly, using the conversion tables T3*ml* and T3*mn* for magenta color, the value Mi" is converted into values Ml and Mn. More specifically, during the conversion process for cyan, the value Ci" is used to refer to the horizontal axis of FIG. 8, which is represented by the conversion tables T3*cl* and T3*cn* (FIGS. 9(*a*) and 9(*b*)). Then, with respect to the value of the color-and-tone-corrected data Ci" (horizontal axis), a value Cl of light ink color data (vertical axis) is obtained on the light ink conversion line (broken line) and a value Cn of normal ink color data (vertical axis) is obtained on the normal ink conversion line (solid line). Thus, light ink color data Cl and normal ink color data Cn are obtained. In other words, the color-and-tone-corrected color data Ci" is converted into ink data (Cl, Cn). The same operation as described above is performed for magenta color component by using the conversion tables T3*mn* and T3*ml*. Thus, light cyan ink data Cl, normal cyan ink data Cn, light magenta ink data Ml, and normal magenta ink data Mn are produced.

Then, in S400, using the tone correction table T4*cl* for light cyan ink, the light cyan ink value Cl is tone-corrected into a tone-corrected light cyan ink value Cl'. Similarly, using the tone correction table T4*cn* for normal cyan ink, the normal cyan ink value Cn is tone-corrected into a tone-corrected normal cyan ink value Cn'. Using the tone correction table T4*ml* for light magenta ink, the light magenta ink value Ml is tone-corrected into a tone-corrected light magenta ink value Ml'. Similarly, using the tone correction table T4*mn* for normal magenta ink, the normal magenta ink value Mn is tone-corrected into a tone-corrected normal magenta ink value Mn'. More specifically, during the tone correction process for light cyan ink, the value Cl is used to refer to the horizontal axis in the tone-correction table T4*cl* (FIG. 10) for light cyan ink. Then, with respect to the value Cl (horizontal axis), the value of tone-corrected ink data Cl' (right-hand vertical axis) on the tone-correction curve is obtained. Thus, tone-corrected ink data Cl' is obtained for the ink data Cl. The same operation is performed for other remaining values Cn, Ml, and Mn by using the tone-correction tables T4*cn*, T4*ml*, and T4*mn* (FIG. 10) for normal cyan, light magenta, and normal magenta inks.

The thus produced tone-corrected ink data Cl', Cn', Ml', and Mn' are outputted together with the color data Yi" and Ki" for yellow and black components. Thus, a set of data (Cl', Cn', Ml', Mn', Yi", Ki") is obtained based on each set of original input color data (Ci, Mi, Yi, Ki).

Then, in S500, the thus obtained data set (Cl', Cn', Ml', Mn', Yi", Ki"), which has been subjected to the several correction and conversion processes as described above, is subjected to a binarization processes in the well known manner such as those described in the U.S. Pat. No. 5,045,952. Then, a resultant binary signal ($Cl_o$, $Cn_o$, $Ml_o$ $Mn_o$, $Y_o$, $K_o$) is outputted to the color printer 2. The print unit 21 is controlled in S600 to print a color image on the image recording medium based on the binary signal ($Cl_o$, $Cn_o$, $Ml_o$, $Mn_o$, $Y_o$, $K_o$).

It is noted that data of the color-correction table T1 and the conversion tables T3*cl*, T3*cn*, T3*ml*, and T3*mn* is stored in the hard disk 14 as unchangeable, fixed data. However, data of the tone-correction tables T2*c*, T2*m*, T2*y*, and T2*k* (upstream profile U) and the tone-correction tables T4*cl*, T4*cn*, T4*ml*, and T4*mn* (downstream profile D) can be changed or updated according to changes in the printer characteristics. That is, data of the tone-correction tables T2*c*, T2*m*, T2*y*, and T2*k* and the tone-correction tables T4*cl*, T4*cn*, T4*ml*, and T4*mn* can be changed when the characteristics of the printer 2 changes by passage of time. Data of the tone-correction tables T2*c*, T2*m*, T2*y*, and T2*k* and the tone-correction tables T4*cl*, T4*cn*, T4*ml*, and T4*mn* can be changed also when the model of the printer 2 is changed, the type of image recording medium used in the printer 2 is changed, the type of ink used is changed, the resolution set in the printer 2 is changed, or the printing speed set in the printer 2 is changed.

When the user desires to update data of the tone-correction tables T2*c*, T2*m*, T2*y*, and T2*k* and data of the tone-correction tables T4*cl*, T4*cn*, T4*ml*, and T4*mn*, the user instructs the profile preparation system 100 to start executing the profile preparation process of FIG. 3 to update data of the tone-correction tables T2*c*, T2*m*, T2*y*, and T2*k* as data of the upstream profile U and to update data of the tone-correction tables T4*cl*, T4*cn*, T4*ml*, and T4*mn* as data of the downstream profile D.

During the downstream profile production process of S2-S4 (FIG. 3), data of the tone-correction tables T4*cl*, T4*cn*, T4*ml*, and T4*mn* is prepared as a downstream profile D in the same manner as for when the tone-correction tables T4*cl*, T4*cn*, T4*ml*, and T4*mn* are initially produced.

More specifically, in order to prepare the tone correction table T4*cl*, in S2, nine sets of light cyan ink data Cl of 0, 31, 63, 95, 127, 159, 191, 223, and 255 are prepared. By subjecting the nine sets of ink data Cl to no tone-correction process, nine sets of ink data Cl' having the tone values 0, 31, 63, 95, 127, 159, 191, 223, and 255 are obtained. The nine sets of ink data Cl' are binarized in the same manner as in the process of S500, and supplied to the printer 2. As a result, nine color patches are produced as shown in FIG. 2(*b*).

Next, in S3, the output density level of each color patch is measured using the calorimeter 5. Then, in S4, a measurement curve is prepared, based on the measurement results, as indicated by a one-dot-and-one-chain line in FIG. 10. Then, as indicated by a broken line in the same figure, a tone-correction curve is calculated, and is set as a tone-correction table T4*cl*.

It is noted that the tone correction tables T4*cn*, T4*ml*, and T4*mn* are prepared for normal cyan ink, light magenta ink, and normal magenta ink in the same manner as described above for light cyan ink.

During the downstream profile examination process of S6-S8, the table T4*cl* is examined in a manner described below.

First, in S6, nine sets of light cyan ink data Cl of 0, 31, 63, 95, 127, 159, 191, 223, and 255 are prepared, and are tone-corrected into tone-corrected ink data Cl' by using the table T4*cl* which has just been prepared in S4. Then, each set of tone-corrected ink data Cl' is binarized into binarized data Clo, and is supplied to the printer 2. As a result, the print unit 21 is controlled to print nine single-ink patches as shown in FIG. 2(*b*) using light cyan ink.

Then, in S7, the nine single-ink patches are measured by the colorimeter 5, and examination is performed in S8 whether the density of the color patches increases in the monotone nondecreasing manner in accordance with the increase in the value of the original ink data Cl.

More specifically, the CPU 11 judges in S8 whether or not the tone-correction table T4*cl* is suitable by confirming whether the measured density levels of all the nine color patches increase from one to the next color patch in the expected monotone nondecreasing manner. In other words, the CPU 11 judges whether or not the measured density level of each color patch is higher than or equal to its preceding color patch.

It is now assumed that the density level of each color patch has a value D(i) (where i is the order of the subject color patch, $0 \leq i \leq 8$). The CPU 11 judges whether or not the value D(i) of each color patch (i: $0 \leq i \leq 8$) is smaller than or equal to the value D(i+1) of the next color patch (i+1). In other words, the CPU 11 judges whether the following inequality (1) is satisfied:

$$D(i) \leq D(i+1) \quad (1)$$

wherein $0 \leq i \leq 8$.

The CPU 11 determines that the table T4cl is unsuitable when at least one of the nine color patches (i) does not satisfy the inequality (1). The CPU 11 determines that the table T4cl is suitable when all the nine color patches satisfy the inequality (1).

Alternatively, the CPU 11 may judge in S8 whether the measured density level of each color patch is within the desirable range predetermined for the subject color patch. The CPU 11 determines that the table T4cl is suitable when the measured density level D(i) of each color patch (i) is within its desirable range. The CPU 11 determines that the table T4cl is unsuitable when the measured density level D(i) of at least one color patch (i) is out of its desirable range.

The tables T4cn, T4ml, and T4mn are examined in the same manner as described above for table T4cl.

It is noted that in S8, the CPU 11 further judges whether or not all of the four tables T4cl, T4cn, T4ml, and T4mn are suitable. The CPU determines that the downstream profile D is suitable only when all of the four tables T4cl, T4cn, T4ml, and T4mn are suitable. The CPU 11 determines that the downstream profile D is unsuitable when at least one of the four tables T4cl, T4cn, T4ml, and T4mn is unsuitable.

During the upstream profile production process of S9, data of the tone-correction tables T2c, T2m, T2y, and T2k is prepared as an upstream profile U in the same manner as when the tone-correction tables T2c, T2m, T2y, and T2k are initially produced.

More specifically, in order to prepare the table T2c, in S9, nine sets of color data C' of 0, 31, 63, 95, 127, 159, 191, 223, and 255 are prepared. By subjecting the nine sets of color data C' to no tone-correction process, nine sets of color data C" having the values 0, 31, 63, 95, 127, 159, 191, 223, and 255 are obtained. Then, the nine sets of color data C" are converted into nine sets of ink data (Cn, Cl) by using the conversion tables T3cn and T3cl, which are stored in the hard disk 14. Then, the nine sets of ink data (Cn, Cl) are tone-corrected into nine sets of tone-corrected ink data (Cn', Cl') by using the tone-correction tables T4cn and T4cl, which have just been prepared in S4. Then, the nine sets of ink data (Cn', Cl') are binarized in the same manner as in the process of S500, and supplied to the printer 2. As a result, nine color patches are produced as shown in FIG. 2(b). Then, the output density level of each color patch is measured using the colorimeter 5. Based on the measurement results of the nine color patches, a measurement curve is prepared, as indicated by a one-dot-and-one-chain line in FIG. 7. Then, a tone-correction curve is calculated as indicated by a broken line in the same figure, and set as a tone-correction table T2c.

The tone-correction table T2m is prepared in the same manner as described for cyan color.

In order to prepare the tone correction table T2y for yellow color, in S9, nine sets of yellow color data Y' of 0, 31, 63, 95, 127, 159, 191, 223, and 255 are prepared, binarized in the same manner as in the process of S500, and are supplied to the printer 2. As a result, nine color patches are produced by yellow ink as shown in FIG. 2(b). Densities of the nine color patches are measured by the calorimeter 5. Based on the measured results, a measurement curve (one-dot-and-one-chain line) of FIG. 7 is obtained. Then, a tone-correction curve (broken line) is determined and set as a tone-correction table T2y.

It is noted that the tone correction table T2k is prepared for black color in the same manner as described above for yellow color.

During the upstream profile examination process of S11-S13, the table T2c is examined in a manner described below. It is noted that the table T2m is examined in the same manner as described below for table T2c.

First, in S11, nine sets of color data C' of 0, 31, 63, 95, 127, 159, 191, 223, and 255 are prepared, and tone-corrected into tone-corrected color data C" by using the table T2c which has just been prepared in S9. Then, the thus obtained nine sets of tone-corrected color data C" are converted into nine sets of ink data (Cl, Cn) by using the tables T3cn and T3cl which are stored in the hard disk 14. The thus obtained nine sets of ink data (Cl, Cn) are then tone-corrected into (Cl', Cn') by using the tables T4cl and T4cn which have just been prepared in S4. Then, the nine sets of tone-corrected ink data (Cl', Cn') are binarized into binarized data (Clo, Cno), and are supplied to the printer 2. As a result, nine color patches are printed on a recording medium as shown in FIG. 2(b) by using light cyan ink and normal cyan ink.

Then, in S12, the output density level of each color patch is measured using the calorimeter 5. Examination is performed in S13 whether the density of the color patch properly increases in the monotone nondecreasing manner in accordance with the increase in the value of the original color data C'. The examination is performed in S13 in the same manner as in S8. That is, the CPU 11 determines that at least one of the tables T2c, T4cl, and T4cn is unsuitable when at least one of the nine color patches (i) does not satisfy the inequality (1). The CPU 11 determines that all of the tables T2c, T4cl, and T4cn are suitable when all the nine color patches satisfy the inequality (1). Alternatively, the CPU 11 may determine in S13 that all of the tables T2c, T4cl, and T4cn are suitable when the measured density level D(i) of each color patch (i) is within its desirable range. The CPU 11 determines that at least one of the tables T2c, T4cl, and T4cn is unsuitable when the measured density level D(i) of at least one color patch (i) is out of its desirable range.

During the upstream profile examination process of S11-S13, the table T2y is examined in a manner described below. It is noted that the table T2k is examined in the same manner as described below for table T2y.

First, in S11, nine sets of color data Y' of 0, 31, 63, 95, 127, 159, 191, 223, and 255 is tone-corrected into tone-corrected color data Y" by using the table T2y which has just been prepared in S9. Then, nine sets of tone-corrected color data Y" are binarized into binarized data Yo and supplied to the printer 2. As a result, the print unit 21 is controlled to print nine color patches using yellow ink.

The nine single-color patches are then measured in S12 by the calorimeter 5, and examination is performed in S13 whether the density of the color patch properly increases in the monotone nondecreasing manner in accordance with the increase in the value of the original color data Y'. The examination is performed in the same manner as in S8. That is, the CPU 11 determines that the table T2y is unsuitable when at least one of the nine color patches (i) does not satisfy the inequality (1). The CPU 11 determines that the table T2y is suitable when all the nine color patches satisfy the inequality (1). Alternatively, the CPU 11 may determine that the table T2*y* is suitable when the measured density level D(i) of each color patch (i) is within its desirable range. The CPU 11 determines that the table T2*y* is unsuitable when the measured density level D(i) of at least one color patch (i) is out of its desirable range.

It is noted that in S13, the CPU further determines whether or not all of the tables T2*c*, T4*cl*, and T4*cn*, T4*m*, T4*ml*, and T4*nm*, T2*y*, and T2*k* are suitable. The CPU determines that both of the upstream profile U and the downstream profile D are suitable only when all of the eight tables T2*c*, T4*cl*, and T4*cn*, T4*m*, T4*ml*, and T4*nm*, T2*y*, and T2*k* are suitable. The CPU determines that one or both of the upstream profile U and the downstream profile D is unsuitable when at least one of the tables T2*c*, T4*cl*, and T4*cn*, T4*m*, T4*ml*, and T4*nm*, T2*y*, and T2*k* is unsuitable.

It is noted that in the above description, during the downstream profile examination processes of S6-S8, color patches are produced in S6 by preparing nine light cyan values Cl of 0-255. The results measured in S7 for the light cyan ink can therefore be used to prepare the measurement curve for cyan (one-dot-and-one-chain line in FIG. 7) in the range lower than the reference value C' of 127. This is because the measurement curve in that range is produced only by light cyan ink. Accordingly, the tone correction curve or upstream profile T2*c* (broken line in FIG. 7) for cyan in the range lower than the reference tone can be prepared based on the measurement results taken in S7. Similarly, the results measured in S7 for light magenta ink can also be used to prepare the measurement curve for magenta in the range lower than the reference value M' of 127. Accordingly, the tone correction curve T2*m* (upstream profile) for magenta in the range lower than the reference tone can be prepared based on the measurement results taken in S7.

In the above-described example, during the upstream profile preparation process of S9, color patches are printed and measured. Then, based on the measured results, the tables T2*c*, T2*m*, T2*y*, and T2*k* (upstream profile) is prepared. However, if the results measured in S7 during the downstream profile examination procedure can be directly used for preparing the tables T2*c*, T2*m*, T2*y*, and T2*k* (upstream profile), it is unnecessary to perform the color patch printing process or the color patch measuring process during the process of S9.

While the invention has been described in detail with reference to the specific embodiment thereof, it would be apparent to those skilled in the art that various changes and modifications may be made therein without departing from the spirit of the invention, the scope of which is defined by the attached claims.

For example, the embodiment described above is applied to a profile preparation process for preparing the tone correction upstream profile and the tone correction downstream profile. However, the present invention could be applied to any process for preparing a variety of interrelated profiles, of upstream and downstream profiles.

Also, the present invention is not limited to a process for preparing two types of profiles, but could also be applied to a process for preparing three or more profiles.

The embodiment describes measuring density level of the color patches to measure color of the color patches for preparing profiles. However, it is possible to measure other values defined according to L*a*b* or L*u*v* calorimetric systems, defined by the CIE (Commission Internationale de l'Eclairage), and the like.

The embodiment describes judging whether profile preparation is to be terminated, directly after preparing the downstream profile and directly after preparing the upstream profile. However, this judgment about profile preparation termination could be made at any timing, as necessity dictates.

Also, in the embodiment, the program always returns to the processes for preparing the downstream profile, whenever it is judged that the downstream profile is improperly prepared. However, the system can be designed to first notify the user that the downstream profile has been improperly prepared, and then enable the user to select whether to continue profile preparation processes. Similarly, the program always returns to the processes for preparing the downstream profile, whenever it is judged that the upstream and/or downstream profile is improperly prepared. However, the system can be designed to first notify the user that at least one profile has been improperly prepared, and then enable the user to select whether to continue profile preparation processes.

Figure 4:
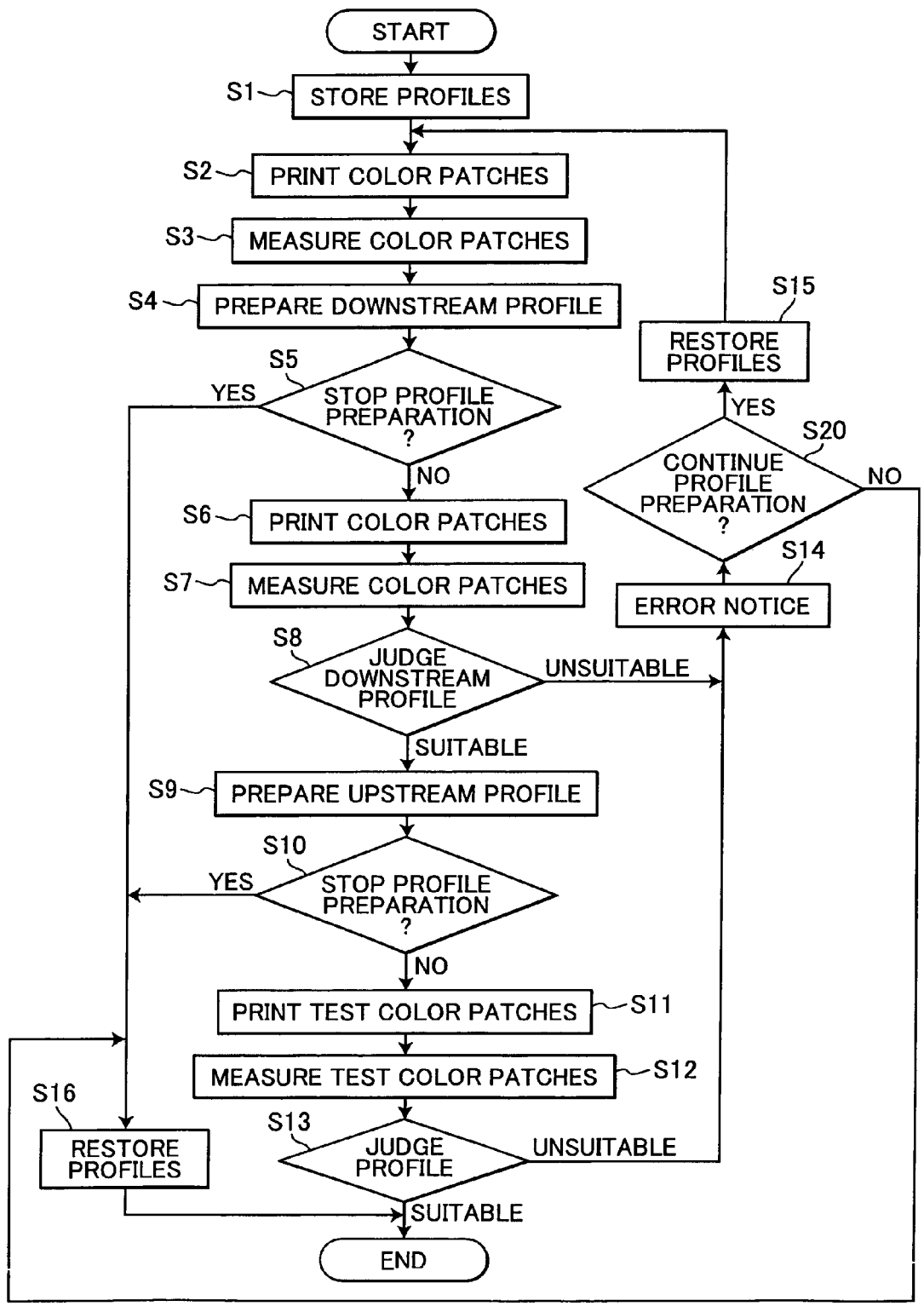
FIG. 4 is a flowchart representing a modification of the profile preparation routine.

More specifically, a step of S20 may be added between the processes of S14 and S15 as shown in FIG. 4. In this case, in S14, the CRT display 16 is first controlled to display that the presently-prepared profile(s) has been improperly prepared. Then, in S20, the CRT display 16 is further controlled to display a message asking the user whether he/she desires to continue the profile preparation processes. Upon viewing the message, the user inputs, via the input unit 18, his/her confirmation whether he/she desires to continue the present profile preparation processes. When the user confirms his/her desire to continue the present processes (yes in S20), the program proceeds via the process of S15 to return to S2. On the other hand, when the user confirms his/her desire not to continue the present processes (no in S20), the program proceeds to the process of S16, and the process is ended.

What is claimed is:

1. A method for updating profiles, comprising:
   storing a plurality of successive profiles for an image recording device, the profiles being successively used to process image data that is used for recording images on a recording medium by the image recording device; and
   changing at least two of the successive profiles when characteristics of the image recording device change, wherein the plurality of successive profiles include at least an upstream profile and a downstream profile, the upstream profile being used for performing a prior process on the image data and the downstream profile being used for performing a subsequent process on the image data already processed by the prior process, the upstream profile and the downstream profile being changed when the characteristics of the image recording device change.

2. A method as claimed in claim 1, wherein the at least two of the successive profiles are changed when the characteristics of the image recording device change over passage of time.

3. A method as claimed in claim 1, wherein the at least two of the successive profiles are changed when a model of the image recording device is changed.

4. A method as claimed in claim 1, wherein the at least two of the successive profiles are changed when a type of the image recording medium used is changed.

5. A method as claimed in claim 1, wherein the at least two of the successive profiles are changed when a type of ink used in the image recording device is changed.

6. A method as claimed in claim 1, wherein the at least two of the successive profiles are changed when a setting of a resolution in the image recording device is changed.

7. A method as claimed in claim 1, wherein the at least two of the successive profiles are changed when a setting of a printing speed in the image recording device is changed.

8. A method as claimed in claim 1, wherein the changing step includes:
   preparing a new downstream profile;
   preparing a new upstream profile using the prepared new downstream profile; and
   writing the new downstream profile and the new upstream profile over the already-stored downstream and upstream profiles.

9. A method as claimed in claim 8, wherein the changing step further includes judging, after the new downstream profile preparation process and before the new upstream profile preparation process, whether the new downstream profile has been properly prepared by processing image data using the prepared new downstream profile, by controlling the image recording device to record the processed image data on a recording medium, by examining a recorded result, and by judging whether or not the new downstream profile has been properly prepared based on the examined result, and when it is judged that the new downstream profile has been improperly prepared, preventing the new upstream profile preparation process from being performed based on the improperly-prepared new downstream profile.

10. A method as claimed in claim 9, wherein the prevention process includes the step of terminating preparation of the new upstream and downstream profiles.

11. A method as claimed in claim 9, wherein the judgment process restarts the new downstream profile preparation process when it is judged that the new downstream profile has been improperly prepared.

12. A method as claimed in claim 9, wherein the changing step further includes:
   setting the already-stored downstream profile and the upstream profile as an initial downstream profile and an initial upstream profile, respectively; and
   judging, after the new upstream profile preparation process, whether the prepared new upstream profile and the new downstream profile have been properly prepared by processing image data using the prepared new upstream profile in a prior process, by further processing the processed image data using the prepared new downstream profile in a subsequent process, by controlling the image recording device to record on a recording medium the image data processed using both of the new upstream profile and the new downstream profile, by examining a recorded result, and by judging whether the new upstream profile and the new downstream profile have been properly prepared based on the examined result, and when it is judged that at least one of the new upstream profile and the new downstream profile has been improperly prepared, restoring the new downstream and upstream profiles to the initial downstream and upstream profiles.

13. A method as claimed in claim 12, wherein the changing step further includes, after the restoring process, a step of terminating preparation of the new upstream profile and the new downstream profile.

14. A method as claimed in claim 12, wherein the changing step further includes, after the restoring process a step of restarting the new downstream profile preparation process.

15. A device for updating profiles, comprising:
   a memory that stores a plurality of successive profiles for an image recording device, the profiles being successively used to process image data that is used for recording images on a recording medium by the image recording device; and
   a changing unit that changes at least two of the successive profiles when characteristics of the image recording device change, wherein the plurality of successive profiles include at least an upstream profile and a downstream profile, the upstream profile being used for performing a prior process on the image data and the downstream profile being used for performing a subsequent process on the image data already processed by the prior process, the changing unit changing the upstream profile and the downstream profile when the characteristics of the image recording device change.

16. A device as claimed in claim 15, wherein the changing unit changes the at least two of the successive profiles when the characteristics of the image recording device change over passage of time.

17. A device as claimed in claim 15, wherein the changing unit changes the at least two of the successive profiles when a model of the image recording device is changed.

18. A device as claimed in claim 15, wherein the changing unit changes the at least two of the successive profiles when a type of the image recording medium used is changed.

19. A device as claimed in claim 15, wherein the changing unit changes the at least two of the successive profiles when a type of ink used in the image recording device is changed.

20. A device as claimed in claim 15, wherein the changing unit changes the at least two of the successive profiles when a setting of a resolution in the image recording device is changed.

21. A device as claimed in claim 15, wherein the changing unit changes the at least two of the successive profiles when a setting of a printing speed in the image recording device is changed.

22. A device as claimed in 15, wherein the changing unit includes:
   a downstream profile preparing unit preparing a new downstream profile;
   an upstream profile preparing unit preparing a new upstream profile using the prepared new downstream profile; and
   a writing unit writing the new downstream profile and the new upstream profile in the memory over the already-stored downstream and upstream profiles.

23. A device as claimed in claim 22, wherein the changing unit further includes a judging unit judging, after the new downstream profile preparation process and before the new upstream profile preparation process, whether the new downstream profile has been properly prepared by processing image data using the prepared new downstream profile, by controlling the image recording device to record the processed image data on a recording medium, by examining a recorded result, and by judging whether the new downstream profile has been properly prepared based on the examined result, and when it is judged that the new downstream profile has been improperly prepared, preventing the upstream profile preparation unit from performing the preparation based on the improperly-prepared new downstream profile.

24. A device as claimed in claim 23, wherein the judging unit controls the upstream and downstream profile preparing units to terminate preparation of the new upstream profile and the new downstream profile, thereby preventing the upstream profile preparation unit from performing the preparation based on the improperly-prepared new downstream profile.

25. A device as claimed in claim 23, wherein the judging unit controls the downstream profile preparing unit to restart the new downstream profile preparation process when it is judged that the new downstream profile has been improperly prepared.

26. A device as claimed in claim 23, wherein the changing unit further includes a setting unit setting the presently-existing downstream profile and the presently-existing upstream profile as an initial downstream profile and an initial upstream profile, respectively; and wherein the judging unit judges, after the upstream profile preparation process, whether the prepared new upstream profile and the new downstream profile have been properly prepared by processing image data using the prepared new upstream profile in a prior process, by further processing the processed image data using the prepared new downstream profile in a subsequent process, by controlling the image recording device to record on a recording medium the image data processed using both of the new upstream profile and the new downstream profile, by examining a recorded result, and by judging whether or not the new upstream profile and the new downstream profile have been properly prepared based on the examined result, and when it is judged that at least one of the new upstream profile and the new downstream profile has been improperly prepared, restores the new downstream and upstream profiles to the initial downstream and upstream profiles.

27. A device as claimed in claim 26, wherein the judging unit controls, after the restoring process, the upstream and downstream profile preparing unit to terminate the preparation of the new upstream profile and the new downstream profile.

28. A device as claimed in claim 26, wherein the judging unit controls, after the restoring process, the downstream profile preparing unit to restart the downstream profile preparation process.

29. A method for updating profiles, comprising:
    storing a plurality of successive profiles for an image recording device, the profiles being successively used to process image data that is used for recording images on a recording medium by the image recording device; and
    changing at least two of the successive profiles upon receipt of a user's instruction, wherein the plurality of successive profiles include at least an upstream profile and a downstream profile, the upstream profile being used for performing a prior process on the image data and the downstream profile being used for performing a subsequent process on the image data already processed by the prior process,
    wherein the changing step includes:
    preparing a new downstream profile;
    preparing a new upstream profile using the prepared new downstream profile; and
    writing the new downstream profile and the new upstream profile over the already-stored downstream and upstream profiles.

30. A method as claimed in claim 29, wherein the changing step further includes judging, after the new downstream profile preparation process and before the new upstream profile preparation process, whether the new downstream profile has been properly prepared by processing image data using the prepared new downstream profile, by controlling the image recording device to record the processed image data on a recording medium, by examining a recorded result, and by judging whether or not the new downstream profile has been properly prepared based on the examined result, and when it is judged that the new downstream profile has been improperly prepared, preventing the new upstream profile preparation process from being performed based on the improperly-prepared new downstream profile.

31. A method as claimed in claim 30, wherein the prevention process includes the step of terminating preparation of the new upstream and downstream profiles.

32. A method as claimed in claim 30, wherein the judgment process restarts the new downstream profile preparation process when it is judged that the new downstream profile has been improperly prepared.

33. A method as claimed in claim 30, wherein the changing step further includes:
    setting the already-stored downstream profile and the upstream profile as an initial downstream profile and an initial upstream profile; and
    judging, after the new upstream profile preparation process, whether the prepared new upstream profile and the new downstream profile have been properly prepared by processing image data using the prepared new upstream profile in a prior process, by further processing the processed image data using the prepared new downstream profile in a subsequent process, by controlling the image recording device to record on a recording medium the image data processed using both of the new upstream profile and the new downstream profile, by examining a recorded result, and by judging whether the new upstream profile and the new downstream profile have been properly prepared based on the examined result, and when it is judged that at least one of the new upstream profile and the new downstream profile has been improperly prepared, restoring the new downstream and upstream profiles to the initial downstream and upstream profiles.

34. A method as claimed in claim 33, wherein the changing step further includes, after the restoring process, the step of terminating preparation of the new upstream profile and the new downstream profile.

35. A method as claimed in claim 33, wherein the changing step further includes, after the restoring process, the step of restarting the new downstream profile preparation process.

36. A device for updating profiles, comprising:
    a memory that stores a plurality of successive profiles for an image recording device, the profiles being successively used to process image data that is used for recording images on a recording medium by the image recording device; and
    a changing unit that changes at least two of the successive profiles upon receipt of a user's instruction, wherein the plurality of successive profiles include at least an upstream profile and a downstream profile, the upstream profile being used for performing a prior process on the image data and the downstream profile being used for performing a subsequent process on the image data already processed by the prior process, and
    wherein the changing unit includes:
    a downstream profile preparing unit preparing a new downstream profile;
    an upstream profile preparing unit preparing a new upstream profile using the prepared new downstream profile; and
    a writing unit writing the new downstream profile and the new upstream profile in the memory over the already-stored downstream and upstream profiles.

37. A device as claimed in claim 36, wherein the changing unit further includes a judging unit judging, after the new downstream profile preparation process and before the new upstream profile preparation process, whether the new downstream profile has been properly prepared by processing image data using the prepared new downstream profile, by controlling the image recording device to record the processed image data on a recording medium, by examining a recorded result, and by judging whether the new downstream profile has been properly prepared based on the examined result, and when it is judged that the new downstream profile has been improperly prepared, preventing the upstream profile preparation unit from performing the preparation based on the improperly-prepared new downstream profile.

38. A device as claimed in claim 37, wherein the judging unit controls the upstream and downstream profile preparing units to terminate preparation of the new upstream profile and the new downstream profile, thereby preventing the upstream profile preparation unit from performing the preparation based on the improperly-prepared new downstream profile.

39. A device as claimed in claim 37, wherein the judging unit controls the downstream profile preparing unit to restart the new downstream profile preparation process when it is judged that the new downstream profile has been improperly prepared.

40. A device as claimed in claim 37, wherein the changing unit further includes a setting unit setting the presently-existing downstream profile and a presently-existing upstream profile as an initial downstream profile and an initial upstream profile; and wherein the judging unit judges, after the upstream profile preparation process, whether the prepared new upstream profile and the new downstream profile have been properly prepared by processing image data using the prepared new upstream profile in a prior process, by further processing the processed image data using the prepared new downstream profile in a subsequent process, by controlling the image recording device to record on a recording medium the image data processed using both of the new upstream profile and the new downstream profile, by examining a recorded result, and by judging whether or not the new upstream profile and the new downstream profile have been properly prepared based on the examined result, and when it is judged that at least one of the new upstream profile and the new downstream profile has been improperly prepared, restores the new downstream and upstream profiles to the initial downstream and upstream profiles.

41. A device as claimed in claim 40, wherein the judging unit controls, after the restoring process, the upstream and downstream profile preparing unit to terminate the preparation of the new upstream profile and the new downstream profile.

42. A device as claimed in claim 40, wherein the judging unit controls, after the restoring process, the downstream profile preparing unit to restart the downstream profile preparation process.

43. A method for updating profiles, comprising:

storing a plurality of successive profiles for an image recording device, the profiles being successively used to process image data that is used for recording images on a recording medium by the image recording device;

inputting an instruction when characteristics of the image recording device change; and starting to change at least two of the successive profiles in response to the input of the instruction, wherein the plurality of successive profiles include at least an upstream profile and a downstream profile, the upstream profile being used for performing a prior process on the image data and the downstream profile being used for performing a subsequent process on the image data already processed by the prior process, wherein the changing step includes:

preparing a new downstream profile;

preparing a new upstream profile using the prepared new downstream profile; and writing the new downstream profile and the new upstream profile over the already-stored downstream and upstream profiles.

44. A device for updating profiles, comprising:

a memory that stores a plurality of successive profiles for an image recording device, the profiles being successively used to process image data that is used for recording images on a recording medium by the image recording device;

an instruction input unit that receives a user's instruction when characteristics of the image recording device change; and a changing unit that changes at least two of the successive profiles upon receipt of a user's instruction, wherein the plurality of successive profiles include at least an upstream profile and a downstream profile, the upstream profile being used for performing a prior process on the image data and the downstream profile being used for performing a subsequent process on the image data already processed by the prior process, and wherein the changing unit includes;

a downstream profile preparing unit preparing a new downstream profile;

an upstream profile preparing unit preparing a new upstream profile using the prepared new downstream profile; and a writing unit writing the new downstream profile and the new upstream profile in the memory over the already-stored downstream and upstream profiles.

* * * * *